(12) United States Patent
Jung et al.

(10) Patent No.: US 11,816,834 B2
(45) Date of Patent: Nov. 14, 2023

(54) UNMANNED AERIAL SYSTEM GENOTYPE ANALYSIS USING MACHINE LEARNING ROUTINES

(71) Applicants: Jinha Jung, West Lafayette, IN (US); Juan Landivar, Robstown, TX (US); Murilo Maeda, Lubbock, TX (US); Akash Ashapure, West Lafayette, IN (US)

(72) Inventors: Jinha Jung, West Lafayette, IN (US); Juan Landivar, Robstown, TX (US); Murilo Maeda, Lubbock, TX (US); Akash Ashapure, West Lafayette, IN (US)

(73) Assignee: The Texas A&M University System, College Station, TX (US)

( * ) Notice: Subject to any disclaimer, the term of this patent is extended or adjusted under 35 U.S.C. 154(b) by 472 days.

(21) Appl. No.: 17/142,457

(22) Filed: Jan. 6, 2021

(65) Prior Publication Data
US 2021/0209747 A1    Jul. 8, 2021

Related U.S. Application Data

(60) Provisional application No. 62/957,510, filed on Jan. 6, 2020.

(51) Int. Cl.
*G06T 7/00* (2017.01)
*G06N 20/00* (2019.01)
(Continued)

(52) U.S. Cl.
CPC .......... *G06T 7/0012* (2013.01); *B64C 39/024* (2013.01); *G01N 21/17* (2013.01);
(Continued)

(58) Field of Classification Search
CPC ...... A01B 79/005; A01G 7/045; G05B 13/04; G06V 20/20; G06N 3/08
See application file for complete search history.

(56) References Cited

U.S. PATENT DOCUMENTS

| | | | |
|---|---|---|---|
| 8,532,930 B2* | 9/2013 | Rabinowitz | G16B 20/00 703/11 |
| 10,002,416 B2* | 6/2018 | Mannar | G06T 7/0002 |

(Continued)

OTHER PUBLICATIONS

Xiao-Hua, Y. A. N. G., et al. "Comparison between radial basis function neural network and regression model for estimation of rice biophysical parameters using remote sensing." Pedosphere 19.2 (2009): 176-188.

(Continued)

*Primary Examiner* — Yosef Kassa
(74) *Attorney, Agent, or Firm* — Thomas | Horstemeyer, LLP

(57) ABSTRACT

Various embodiments are disclosed for a machine learning system for automatic genotype selection and performance evaluation using multi-source and spatiotemporal remote sensing data collected from an unmanned aerial system (UAS). A computing device may be configured to access images of a field having a first genotype and a second genotype of at least one crop or plant planted therein. The computing device may apply an image processing routine to the images to analyze the images of the field and determine characteristics of the first genotype and the second genotype of the at least one crop or plant planted in the field. The computing device may then apply a machine learning routine to forecast a first estimated yield of the first genotype and a second estimated yield of the second genotype using the identified characteristics of the first genotype and the second genotype.

20 Claims, 22 Drawing Sheets
(19 of 22 Drawing Sheet(s) Filed in Color)

(51) Int. Cl.

| | |
|---|---|
| G06T 17/05 | (2011.01) |
| G01N 21/17 | (2006.01) |
| G06N 3/04 | (2023.01) |
| B64C 39/02 | (2023.01) |
| G06V 10/764 | (2022.01) |
| G06V 10/82 | (2022.01) |
| G06V 20/13 | (2022.01) |
| B64U 101/30 | (2023.01) |

(52) U.S. Cl.
CPC ............. *G06N 3/04* (2013.01); *G06N 20/00* (2019.01); *G06T 7/0004* (2013.01); *G06T 17/05* (2013.01); *G06V 10/764* (2022.01); *G06V 10/82* (2022.01); *G06V 20/13* (2022.01); *B64U 2101/30* (2023.01); *G01N 2021/177* (2013.01); *G06T 2207/10004* (2013.01); *G06T 2207/20081* (2013.01); *G06T 2207/20084* (2013.01); *G06T 2207/30188* (2013.01)

(56) References Cited

U.S. PATENT DOCUMENTS

| | | | | |
|---|---|---|---|---|
| 10,430,949 | B1* | 10/2019 | Wang | G06N 3/084 |
| 10,614,562 | B2* | 4/2020 | Mannar | G06T 7/0002 |
| 2007/0020651 | A1* | 1/2007 | Frudakis | C12Q 1/6883 |
| | | | | 435/6.16 |
| 2019/0059202 | A1* | 2/2019 | Lorek | A01B 79/005 |

OTHER PUBLICATIONS

Yang, Yingbao, et al. "Downscaling land surface temperature in an arid area by using multiple remote sensing indices with random forest regression." Remote Sensing 9.8 (2017): 789.

Yeom, Junho, et al. "Comparison of vegetation indices derived from UAV data for differentiation of tillage effects in agriculture." Remote Sensing 11.13 (2019): 1548.

You, Jiaxuan, et al. "Deep gaussian process for crop yield prediction based on remote sensing data." Proceedings of the AAAI Conference on Artificial Intelligence vol. 31 No. 1. 2017.

Yu, Neil, et al. "Development of methods to improve soybean yield estimation and predict plant maturity with an unmanned aerial vehicle based platform." Remote Sensing of Environment 187 (2016): 91-101.

Zarco-Tejada, Pablo J., et al. "Tree height quantification using very high resolution imagery acquired from an unmanned aerial vehicle (UAV) and automatic 3D photo-reconstruction methods." European journal of agronomy 55 (2014): 89-99.

Zhou, X., et al. "Predicting grain yield in rice using multi-temporal vegetation indices from UAV-based multispectral and digital imagery." ISPRS Journal of Photogrammetry and Remote Sensing 130 (2017): 246-255.

Zhou, Xudong, et al. "Estimation of biomass in wheat using random forest regression algorithm and remote sensing data." The Crop Journal 4.3 (2016): 212-219.

Ashapure, Akash, et al. "Developing a machine learning based cotton yield estimation framework using multi-temporal UAS data." ISPRS Journal of Photogrammetry and Remote Sensing 169 (2020): 180-194.

Jung, Jinha, et al. "The potential of remote sensing and artificial intelligence as tools to improve the resilience of agriculture production systems." Current Opinion in Biotechnology 70 (2021): 15-22.

Weiss, Marie; et al. "Remote sensing for agricultural applications: A meta-review." Remote Sensing of Environment 236 (2020): 111402.

Van Rossum; et al. "Python reference manual." Indiana: iUniverse, 2000. Uploaded into 2 separate files due to size.

Adhikari, P., et al. "Calibration and validation of CSM-CROPGRO-Cotton model using lysimeter data in the Texas High Plains." Journal of Contemporary Water Research & Education 162.1 (2017): 61-78.

Andujar, Dionisio, et al. "Using depth cameras to extract structural parameters to assess the growth state and yield of cauliflower crops." Computers and Electronics in Agriculture 122 (2016): 67-73.

Andujar, Dionisio, et al. "A LiDAR-based system to assess poplar biomass." Gesunde Pflanzen 68.3 (2016): 155-162.

Ashapure, Akash, et al. "A comparative study of RGB and multispectral sensor-based cotton canopy cover modelling using multi-temporal UAS data." Remote Sensing 11.23 (2019): 2757.

Ashapure, Akash, et al. "A novel framework to detect conventional tillage and no-tillage cropping system effect on cotton growth and development using multi-temporal UAS data." ISPRS Journal of Photogrammetry and Remote Sensing 152 (2019): 49-64.

Behmann, Jan, et al. "A review of advanced machine learning methods for the detection of biotic stress in precision crop protection." Precision Agriculture 16.3 (2015): 239-260.

Bendig, Juliane; et al. "4 UAV-based Imaging for Multi-Temporal, very high Resolution Crop Surface Models to monitor Crop Growth Variability." Unmanned aerial vehicles (UAVs) for multi-temporal crop surface modelling (2013): 44.

Bendig, Juliane, et al. "Combining UAV-based plant height from crop surface models, visible, and near infrared vegetation indices for biomass monitoring in barley." International Journal of Applied Earth Observation and Geoinformation 39 (2015): 79-87.

Chen, Gang; et al. "A support vector regression approach to estimate forest biophysical parameters at the object level using airborne lidar transects and quickbird data." Photogrammetric Engineering & Remote Sensing 77.7 (2011): 733-741.

Chianucci, Francesco, et al. "Estimation of canopy attributes in beech forests using true colour digital images from a small fixed-wing UAV." International journal of applied earth observation and geoinformation 47 (2016): 60-68.

Chlingaryan, Anna; et al. "Machine learning approaches for crop yield prediction and nitrogen status estimation in precision agriculture: A review." Computers and electronics in agriculture 151 (2018): 61-69.

Chopping, Mark. "CANAPI: Canopy analysis with panchromatic imagery." Remote Sensing Letters 2.1 (2011): 21-29.

Clement, J. D.; et al. "Increasing cotton seed fibre density as a breeding strategy to improve fibre fineness." Field Crops Research 160 (2014): 81-89.

Cui, Yaokui, et al. "Using airborne LiDAR to retrieve crop structural parameters." 2010 IEEE International Geoscience and Remote Sensing Symposium. IEEE, 2010.

Cunliffe, Andrew M.; et al. "Ultra-fine grain landscape-scale quantification of dryland vegetation structure with drone-acquired structure-from-motion photogrammetry." Remote Sensing of Environment 183 (2016): 129-143.

Da Silva, Eder Eujácio, et al. "UAV-multispectral and vegetation indices in soybean grain yield prediction based on in situ observation." Remote Sensing Applications: Society and Environment 18 (2020): 100318.

Dandois, Jonathan P; et al. "High spatial resolution three-dimensional mapping of vegetation spectral dynamics using computer vision." Remote Sensing of Environment 136 (2013): 259-276.

Dash, Ch Sanjeev Kumar, et al. "Radial basis function neural networks: a topical state-of-the-art survey." Open Computer Science 1.open-issue (2016).

Di Gennaro, Salvatore Filippo, et al. "UAV-based high-throughput phenotyping to discriminate barley vigour with visible and near-infrared vegetation indices." International journal of remote sensing 39.15-16 (2018): 5330-5344.

Diaz-Varela, Ramón A., et al. "Automatic identification of agricultural terraces through object-oriented analysis of very high resolution DSMs and multispectral imagery obtained from an unmanned aerial vehicle." Journal of environmental management 134 (2014): 117-126.

(56) References Cited

OTHER PUBLICATIONS

Duan, Tao, et al. "Dynamic monitoring of NDVI in wheat agronomy and breeding trials using an unmanned aerial vehicle." Field Crops Research 210 (2017): 71-80.
Eisenbeiss, Henri; et al. "Investigation of UAV systems and flight modes for photogrammetric applications." The Photogrammetric Record 26.136 (2011): 400-421.
Feng, An Shun; et al. "Low-Frequency Magnetic Shielding Effectiveness of Braided Three-Phase Power Cable Based on 12-Pulse Bridge Rectifier Circuit and PWM Inverter Circuit." 2018 International Applied Computational Electromagnetics Society Symposium-China (ACES). IEEE, 2018.
Feng, Aijing, et al. "Yield estimation in cotton using UAV-based multi-sensor imagery." Biosystems Engineering 193 (2020): 101-114.
Ferencz, Cs, et al. "Crop yield estimation by satellite remote sensing." International Journal of Remote Sensing 25.20 (2004): 4113-4149.
Fushiki, Tadayoshi. "Estimation of prediction error by using K-fold cross-validation." Statistics and Computing 21.2 (2011): 137-146.
Gandhi, Niketa; et al. "Rice crop yield prediction using artificial neural networks." 2016 IEEE Technological Innovations in ICT for Agriculture and Rural Development (TIAR). IEEE, 2016.
Garson, David G. "Interpreting neural network connection weights." (1991): 47-51.
Geipel, Jakob, et al. "A programmable aerial multispectral camera system for in-season crop biomass and nitrogen content estimation." Agriculture 6.1 (2016): 4.
Gevaert, Caroline M., et al. "Generation of spectral-temporal response surfaces by combining multispectral satellite and hyperspectial UAV imagery for precision agriculture applications." IEEE Journal of Selected Topics in Applied Earth Observations and Remote Sensing 8.6 (2015): 3140-3146.
Gevrey, Muriel; et al. "Review and comparison of methods to study the contribution of variables in artificial neural network models." Ecological modelling 160.3 (2003): 249-264.
Gómez-Candón, David; et al. "Assessing the accuracy of mosaics from unmanned aerial vehicle (UAV) imagery for precision agriculture purposes in wheat." Precision Agriculture 15.1 (2014): 44-56.
Gopal, PS Maya; et al. "A novel approach for efficient crop yield prediction." Computers and Electronics in Agriculture 165 (2019): 104968.
PS, Maya Gopal. "Performance evaluation of best feature subsets for crop yield prediction using machine learning algorithms." Applied Artificial Intelligence 33.7 (2019): 621-642.
Guan, Senlin, et al. "Assessing correlation of high-resolution NDVI with fertilizer application level and yield of rice and wheat crops using small UAVs." Remote Sensing 11.2 (2019): 112.
Hassan, Muhammad Adeel, et al. "A rapid monitoring of NDVI across the wheat growth cycle for grain yield prediction using a multi-spectral UAV platform." Plant science 282 (2019): 95-103.
Hien, Dang Thi Thu; et al. "An effective solution to regression problem by RBF neuron network." International Journal of Operations Research and Information Systems (IJORIS) 6.4 (2015): 57-74.
Holman, Fenner H., et al. "High throughput field phenotyping of wheat plant height and growth rate in field plot trials using UAV based remote sensing." Remote Sensing 8.12 (2016): 1031.
Honkavaara, Eija, et al. "Processing and assessment of spectrometric, stereoscopic imagery collected using a lightweight UAV spectral camera for precision agriculture." Remote Sensing 5.10 (2013): 5006-5039.
Huang, Cho-ying, et al. "Postfire stand structure in a semiarid savanna: Cross-scale challenges estimating biomass." Ecological Applications 17.7 (2007): 1899-1910.
Hultquist, Carolynne; et al. "A comparison of Gaussian process regression, random forests and support vector regression for burn severity assessment in diseased forests." Remote sensing letters 5.8 (2014): 723-732.

Hunt, Merryn L., et al. "High resolution wheat yield mapping using Sentinel-2." Remote Sensing of Environment 233 (2019): 111410.
Iqbal, M., et al. "Evaluation and prospects of F2 genotypes of cotton (*Gossypium hirsutum* L) for yield and yield components." Int. J. Agri. Biol 10 (2008): 442-446.
Jung, Jinha, et al. "Unmanned aerial system assisted framework for the selection of high yielding cotton genotypes." Computers and Electronics in Agriculture 152 (2018): 74-81.
Jung, Yoonsuh; et al. "AK-fold averaging cross-validation procedure." Journal of nonparametric statistics 27.2 (2015): 167-179.
Kamir, Elisa; et al. "Estimating wheat yields in Australia using climate records, satellite image time series and machine learning methods." ISPRS Journal of Photogrammetry and Remote Sensing 160 (2020): 124-135.
Kazemitabar, S. Jalil, et al. "Variable importance using decision trees." Proceedings of the 31st International Conference on Neural Information Processing Systems. 2017.
Kazerani, Borzo. "Determination of the best cotton cultivars and selection criteria to improve yield in Gorgan climatic region." African Journal of Agricultural Research 7.11 (2012): 1719-1726.
Keightley, Keir E.; et al. "3D volumetric modeling of grapevine biomass using Tripod LiDAR." Computers and Electronics in Agriculture 74.2 (2010): 305-312.
Khaki, Saeed; et al. "Classification of crop tolerance to heat and drought—a deep convolutional neural networks approach." Agronomy 9.12 (2019): 833.
Khaki, Saeed; et al. "A cnn-rnn framework for crop yield prediction." Frontiers in Plant Science 10 (2020): 1750.
Khoshroo, Alireza, et al. "Sensitivity analysis of energy inputs in crop production using artificial neural networks." Journal of cleaner production 197 (2018): 992-998.
Kim, Nari, et al. "A comparison between major artificial intelligence models for crop yield prediction: Case study of the midwestern united states, 2006-2015." ISPRS International Journal of Geo-Information 8.5 (2019): 240.
Kingma, Diederik P.; et al. "Adam: A method for stochastic optimization." arXiv preprint arXiv:1412.6980 (2014).
Krishna, N. D. R., et al. "Remote sensing and Geographical Information System for canopy cover mapping." Journal of the Indian Society of Remote Sensing 29.3 (2001): 107-113.
Krofcheck, Dan J., et al. "Detecting mortality induced structural and functional changes in a piñon-juniper woodland using Landsat and RapidEye time series." Remote sensing of environment 151 (2014): 102-113.
Le, Phong; et al. "Quantifying the vanishing gradient and long distance dependency problem in recursive neural networks and recursive LSTMs." arXiv preprint arXiv:1603.00423 (2016).
Li, Bo, et al. "Above-ground biomass estimation and yield prediction in potato by using UAV-based RGB and hyperspectral imaging." ISPRS Journal of Photogrammetry and Remote Sensing 162 (2020): 161-172.
Li, Wang, et al. "Remote estimation of canopy height and aboveground biomass of maize using high-resolution stereo images from a low-cost unmanned aerial vehicle system." Ecological Indicators 67 (2016): 637-648.
Lipton, Zachary C.; et al. "A critical review of recurrent neural networks for sequence learning." arXiv preprint arXiv:1506.00019 (2015).
Lisein, Jonathan, et al. "A photogrammetric workflow for the creation of a forest canopy height model from small unmanned aerial system imagery." Forests 4.4 (2013): 922-944.
Lootens, Peter, et al. "UAV-based remote sensing for evaluation of drought tolerance in forage grasses." Breeding in a World of Scarcity. Springer, Cham, 2016. 111-116.
Lowe, David G. "Distinctive image features from scale-invariant keypoints." International journal of computer vision 60.2 (2004): 91-110.
Lucieer, Arko; et al. "Mapping landslide displacements using Structure from Motion (SfM) and image correlation of multi-temporal UAV photography." Progress in Physical Geography 38.1 (2014): 97-116.

(56) References Cited

OTHER PUBLICATIONS

Maimaitijiang, Maitiniyazi, et al. "Soybean yield prediction from UAV using multimodal data fusion and deep learning." Remote sensing of environment 237 (2020): 111599.
Martinelli, Federico, et al. "Advanced methods of plant disease detection. A review." Agronomy for Sustainable Development 35.1 (2015): 1-25.
Meng, Linghua, et al. "Assessment of the effectiveness of spatiotemporal fusion of multi-source satellite images for cotton yield estimation." Computers and Electronics in Agriculture 162 (2019): 44-52.
Ndikumana, Emile, et al. "Deep recurrent neural network for agricultural classification using multitemporal SAR Sentinel-1 for Camargue, France." Remote Sensing 10.8 (2018): 1217.
Nebiker, S., et al. "Light-weight multispectral UAV sensors and their capabilities for predicting grain yield and detecting plant diseases." International Archives of the Photogrammetry, Remote Sensing & Spatial Information Sciences 41 (2016).
Nock, Charles, et al. "Assessing the potential of low-cost 3D cameras for the rapid measurement of plant woody structure." Sensors 13.12 (2013): 16216-16233.
Novelli, Francesco, et al. "Assimilation of sentinel-2 leaf area index data into a physically-based crop growth model for yield estimation." Agronomy 9.5 (2019): 255.
Oh, Sungchan, et al. "UAS based Tomato Yellow Leaf Curl Virus (TYLCV) disease detection system." Autonomous Air and Ground Sensing Systems for Agricultural Optimization and Phenotyping IV. vol. 11008. International Society for Optics and Photonics, 2019.
Pádua, Luís, et al. "Very high resolution aerial data to support multi-temporal precision agriculture information management." Procedia computer science 121 (2017): 407-414.
Pandey, Abhishek, et al. "General regression neural network and radial basis neural network for the estimation of crop variables of lady finger." Journal of the Indian Society of Remote Sensing 40.4 (2012): 709-715.
Panek, Ewa; et al. "Analysis of relationship between cereal yield and NDVI for selected regions of Central Europe based on MODIS satellite data." Remote Sensing Applications: Society and Environment 17 (2020): 100286.
Pasolli, Luca; et al. "Multi-objective parameter optimization in support vector regression: General formulation and application to the retrieval of soil moisture from remote sensing data." IEEE Journal of Selected Topics in Applied Earth Observations and Remote Sensing 5.5 (2012): 1495-1508.
Patrignani, Andres; et al. "Canopeo: A powerful new tool for measuring fractional green canopy cover." Agronomy Journal 107.6 (2015): 2312-2320.
Paulus, Stefan, et al. "Low-cost 3D systems: suitable tools for plant phenotyping." Sensors 14.2 (2014): 3001-3018.
Pedregosa, Fabian, et al. "Scikit-learn: Machine learning in Python." the Journal of machine Learning research 12 (2011): 2825-2830.
Pineux, Nathalie, et al. "Can DEM time series produced by UAV be used to quantify diffuse erosion in an agricultural watershed?." Geomorphology 280 (2017): 122-136.
Roderick, M. L.; et al. "Remote sensing in vegetation and animal studies." Field and laboratory methods for grassland and animal production research (2000): 205-225.
Rodriguez-Galiano, V., et al. "Machine learning predictive models for mineral prospectivity: An evaluation of neural networks, random forest, regression trees and support vector machines." Ore Geology Reviews 71 (2015): 804-818.
Rouse, J. W., et al. "Monitoring vegetation systems in the Great Plains with ERTS." NASA special publication 351.1974 (1974): 309.
Sargent, Daniel J. "Comparison of artificial neural networks with other statistical approaches: results from medical data sets." Cancer: Interdisciplinary International Journal of the American Cancer Society 91.S8 (2001): 1636-1642.
Sayago, S.; et al. "Crop yield estimation using satellite images: comparison of linear and non-linear models." AgriScientia 35.1 (2018): 1-9.
Shaukat, S. H. A. D. A. B., et al. "Estimation of best parents and superior cross combinations for yield and fiber quality related traits in upland cotton (*Gossypium hirsutum* L.)." Sci. Tech. Dev 32 (2013): 281-284.
Singh, R. A. N. D. H. I. R., et al. "Small area estimation of crop yield using remote sensing satellite data." International Journal of Remote Sensing 23.1 (2002): 49-56.
Stanton, Carly, et al. "Unmanned aircraft system-derived crop height and normalized difference vegetation index metrics for sorghum yield and aphid stress assessment." Journal of Applied Remote Sensing 11.2 (2017): 026035.
Stroppiana, Daniela, et al. "Rice yield estimation using multispectral data from Uav: A preliminary experiment in northern Italy." 2015 IEEE International Geoscience and Remote Sensing Symposium (IGARSS). IEEE, 2015.
Swain, Kishore C; et al. "Adoption of an unmanned helicopter for low-altitude remote sensing to estimate yield and total biomass of a rice crop." Transactions of the ASABE 53.1 (2010): 21-27.
Tokekar, Pratap, et al. "Sensor planning for a symbiotic UAV and UGV system for precision agriculture." IEEE Transactions on Robotics 32.6 (2016): 1498-1511.
Tri, Nguyen Cao, et al. "A novel approach based on deep learning techniques and UAVs to yield assessment of paddy fields." 2017 9th International Conference on Knowledge and Systems Engineering (KSE). IEEE, 2017.
Trout, Thomas J; et al. "Remote sensing of canopy cover in horticultural crops." HortScience 43.2 (2008): 333-337.
Verrelst, Jochem, et al. "Machine learning regression algorithms for biophysical parameter retrieval: Opportunities for Sentinel-2 and-3." Remote Sensing of Environment 118 (2012): 127-139.
Wang, Anna X., et al. "Deep transfer learning for crop yield prediction with remote sensing data." Proceedings of the 1st ACM SIGCAS Conference on Computing and Sustainable Societies. 2018.
Weiss, M., et al. "Review of methods for in situ leaf area index (LAI) determination: Part II. Estimation of LAI, errors and sampling." Agricultural and forest meteorology 121.1-2 (2004): 37-53.
Were, Kennedy, et al. "A comparative assessment of support vector regression, artificial neural networks, and random forests for predicting and mapping soil organic carbon stocks across an Afromontane landscape." Ecological Indicators 52 (2015): 394-403.
Westoby, Matthew J., et al. "Structure-from-Motion'photogrammetry: A low-cost, effective tool for geoscience applications." Geomorphology 179 (2012): 300-314.
Woebbecke, David M., et al. "Color indices for weed identification under various soil, residue, and lighting conditions." Transactions of the ASAE 38.1 (1995): 259-269.
Xiang, Haitao; et al. "Development of a low-cost agricultural remote sensing system based on an autonomous unmanned aerial vehicle (UAV)." Biosystems engineering 108.2 (2011): 174-190.

\* cited by examiner

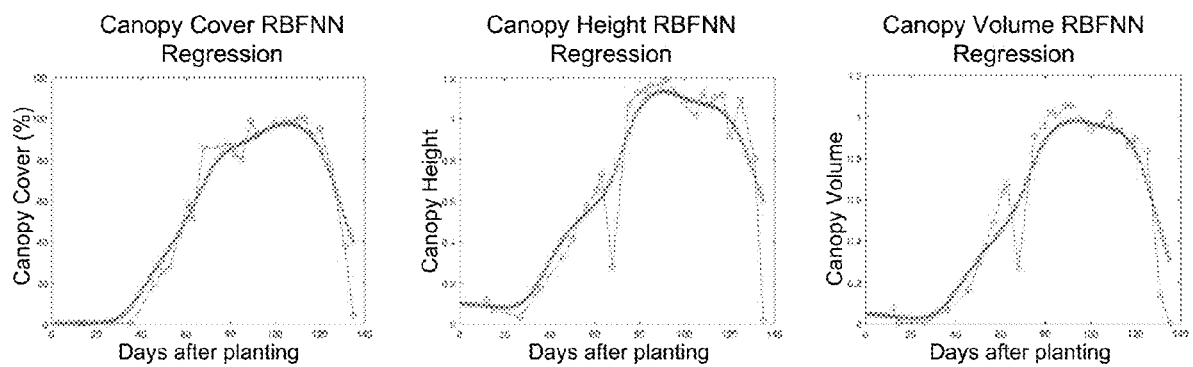
FIG. 16B
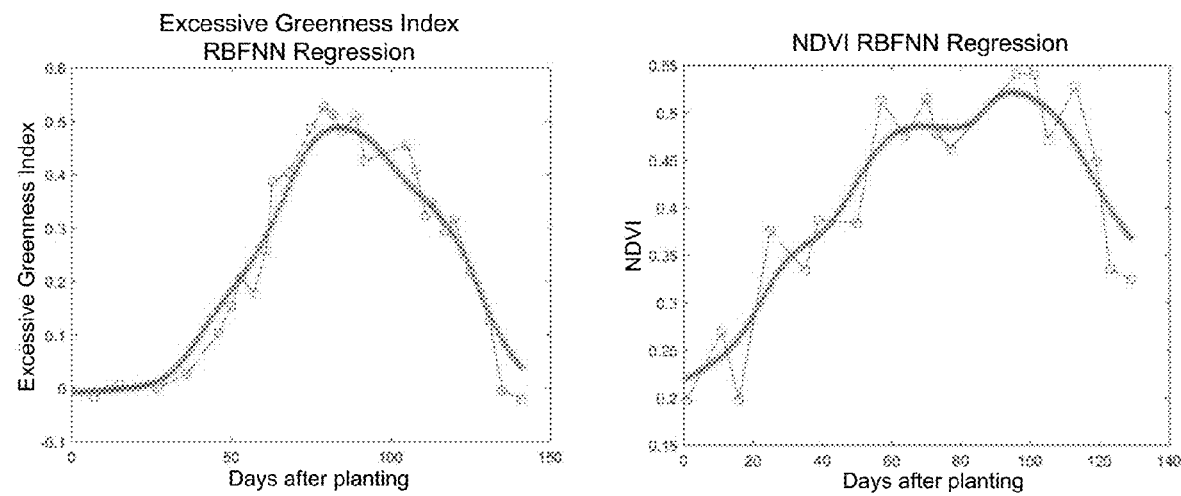

Irrigated – Predicted

UNMANNED AERIAL SYSTEM GENOTYPE ANALYSIS USING MACHINE LEARNING ROUTINES

CROSS-REFERENCE TO RELATED APPLICATION

This application claims the benefit of and priority to U.S. Provisional Patent Application No. 62/957,510 entitled "UNMANNED AERIAL SYSTEM GENOTYPE ANALYSIS USING MACHINE LEARNING ROUTINES," filed Jan. 6, 2020, the contents of which being incorporated by reference in their entirety herein.

BACKGROUND

Harvest yield is one of the most critical determinations in plant breeding programs. However, determining a harvest yield happens is incredibly time-consuming, labor-intensive, and expensive. For instance, identifying the best-performing genotypes from others generally require genotypes to be planted in replicated experiments in different areas of a field. After a certain period of time, the genotypes are harvested and weighed separately to determine an actual yield. Due to the time-intensive nature of having to perform genotype experiments in a field, the size of an experimental field used in breeding trials is often limited by resources available to harvest at the end of a growing season. This impairs the ability to analyze genotypes against a variety of conditions.

Further, various plants have physical and spectral characteristics that can be used to infer a health of a plant or its ability to produce a certain volume of a crop. Physical and spectral characteristics, such as plant height, plant color, or plant volume can be correlated during the life span of a plant, to time to maturity, health status, yield potential, etc. However, plant height, number of blooms, and other characteristics cannot be efficiently and timely measured for large planted areas without employing substantial amount of labor. Similarly, measurements obtained from small samples are often insufficient to accurately extrapolate data across a field, as different portions of a field can have different crop or soil characteristics, different biotic or abiotic stresses, etc.

FIELD OF THE INVENTION

The present invention relates generally to computer-implemented object detection, feature extraction, machine learning, and the application of computing resources in forecasting crop data and performance from images of fields captured using imaging devices and other sensors of manned or unmanned aerial systems (UASs), which may include unmanned aerial vehicles (UAVs), manned aerial vehicles (MAVs), satellites, aerostats, tethered aircrafts, or similar apparatuses.

BRIEF DESCRIPTION OF THE DRAWINGS

The patent or application file contains at least one drawing executed in color. Copies of this patent or patent application with color drawing(s) will be provided by the Office upon request and payment of the necessary fee.

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

FIGS. 16A-16B shows crop feature charts with data extracted from aerial images according to various embodiments.

DETAILED DESCRIPTION

Figure 1:
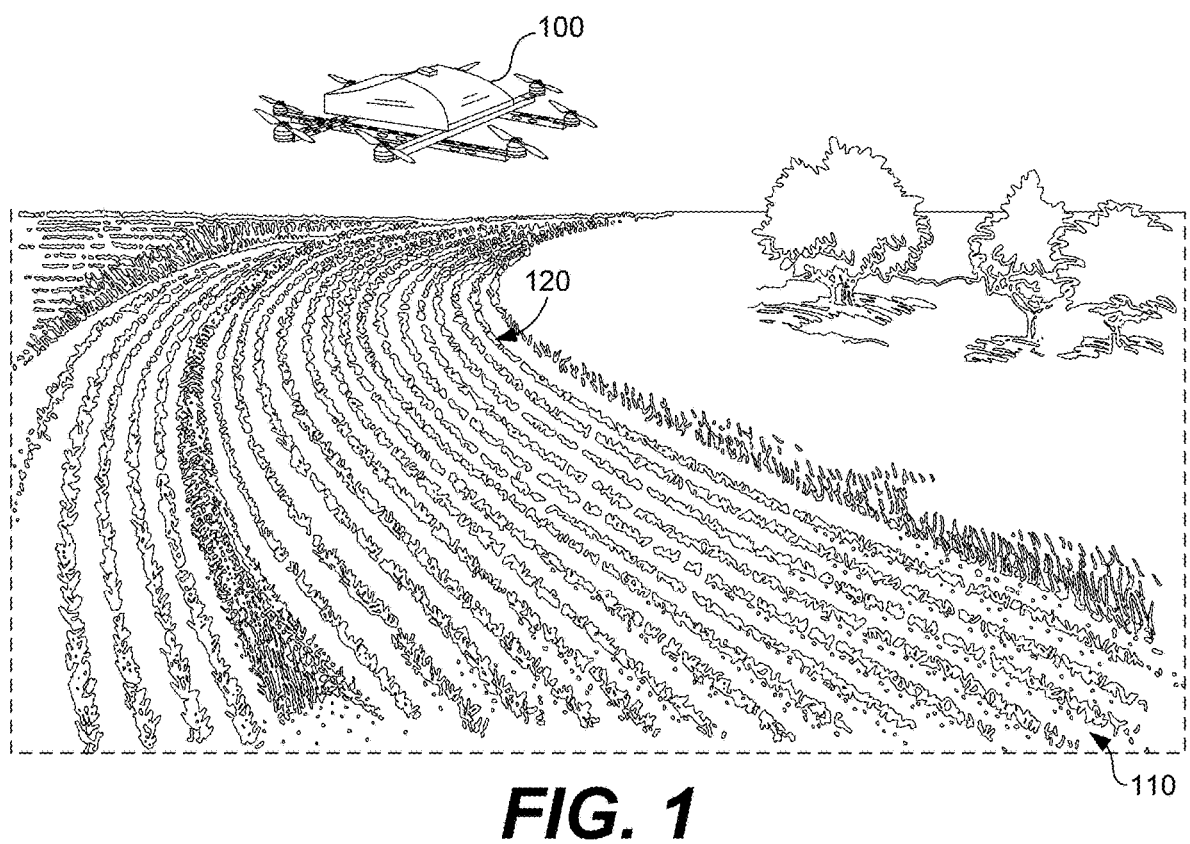
FIG. 1 shows an example of an unmanned aerial system (UAS) flying over a field to generate images of crops planted therein according to various embodiments.

The present disclosure relates to applying machine learning routines to forecast a yield of different genotypes of a crop or plant during a growing season, which can be used to compare performance of genotypes in various field conditions, such as crop damage conditions arising due to biotic or antibiotic stresses, inclement weather, soil types, etc. Further, the present disclosure relates to inferring characteristics of a genotype using data collected by one or more unmanned aerial systems (UASs).

In various embodiments, a system and a computer-implemented method are described for analyzing or characterizing plant genotypes planted in a field. An unmanned aerial system may include one or more sensor devices being configured to capture images of a field having a crop or plant planted therein. As may be appreciated, the images of the field may be generated during a flight or other navigation of the UAS over the field. For instance, the images of the field may include images captured during multiple navigations of the unmanned aerial system at different periods in time. The different periods in time may include different periods in a growing cycle of a crop or plant.

The system may further include one or more computing devices having program instructions stored thereon that, when executed, direct the at least one computing device to analyze one or more plant genotypes. To this end, in some embodiments, the one or more computing devices may access images of the field captured by the unmanned aerial system from memory (whether local or remote), where the images of the field include the crop or plant planted therein. The one or more computing devices may apply an image processing routine to the at least one image to analyze the at least one image of the field and determine various characteristics of the crop or plant planted in the field. One or more of the characteristics may include canopy cover, canopy height, canopy volume, normalized difference vegetation index (NDVI), excessive greenness index (ExG), irrigated characteristics, and non-irrigated characteristics, from which additional information regarding rate and timing of crop growth and development may also be extracted. For example, in instances in which the crop or plant includes cotton, one or more of the characteristics may include bloom count, bloom timing, cotton boll count, boll size, and boll volume.

Thereafter, the one or more computing devices may apply a machine learning routine to forecast an estimated yield of the crop or plant planted in the field. In some embodiments, an input of the machine learning routine comprises at least a portion of the characteristics derived from the image data, which may be used by the machine learning routine in forecasting or generating an estimated yield, as will be discussed. The machine learning routine may include an artificial neural network (ANN), a deep learning routine such as a convolutional neural network (CNN), a radial basis function neural network (RBFNN), or other suitable machine learning routine.

The crop or plant planted in the field may include, for example, a first genotype of the crop or plant and a second genotype of the crop or plant. For instance, if the crop included cotton, the images of the field may include a first genotype of cotton and a second genotype of cotton, where the first genotype and the second genotype are different genotypes. The estimated yield of the crop or plant planted in the field, as generated by the machine learning routine, may include a first estimated yield of the first genotype and a second estimated yield of the second genotype, as may be appreciated.

In some embodiments, the one or more computing devices may generate a recommendation between the first genotype and the second genotype. The recommendation may be generated based at least in part on the first estimated yield of the first genotype and the second estimated yield of the second genotype. The recommendation may be provided to a plant breeder, a researcher, or other individual through a display device, electronic communication, or other suitable medium.

While various examples described herein refer specifically to cotton, it is understood that the system may be employed with other crops or plants, such as various fruit, vegetables, wheat, corn, oats, barley, rye, millets, sorghum, rice, leguminous crops, as well as other types of plants as can be appreciated. The fruit may include tomatoes, citrus fruits, apples, as well as other fruits as may be appreciated. The leguminous crops may include soybeans, cowpeas, peanuts, and other leguminous crops, as can be appreciated.

Using the unmanned aerial sensor and sensor devices coupled thereto, high spatial and temporal resolution data may be captured over various crops (and various genotypes thereof) throughout a growing season. The embodiments described herein include a machine learning framework for yield estimation using multi-source and spatiotemporal remote sensing data collected from an unmanned aerial system. The machine learning routine, such as an artificial neural network machine learning routine, may utilize multi-temporal features identified from image data collected by the unmanned aerial system, such as canopy cover, canopy height, canopy volume, excessive greenness index, among others. In some embodiments, the machine learning routine may utilize weather information, such as humidity, precipitation, temperature, solar radiation, crop canopy temperature, crop evapotranspiration, and other quantifiable weather factors. In some embodiments, the machine learning routine may utilize soil information, such as soil type, physical soil property, soil chemical property, nutrient deficiency or overabundance, mildew characteristic, and other quantifiable soil factors.

The machine learning routine can be trained on actual data measured from past experiments, and can use characteristics derived from the data collected by an unmanned aerial system to generate a predicted yield, which was validated using an actual harvested yield. As may be appreciated, agricultural researchers and plant breeders can use predicted yields as a parameter for genotype selection. The embodiments described herein not only allow researchers and breeders to increase a size of an experimental field for faster genotype selection, but also allow researchers and plant breeders to make an efficient and informed decision on a best performing genotype.

In the following discussion, a general description of the system and its components is provided, followed by a discussion of the operation of the same.

Turning now to FIG. 1, an example of a UAS, illustrated as an unmanned aerial vehicle 100 ("UAV 100"), or a "drone," is shown according to various embodiments. In additional embodiments, the UAS may include a satellite or similar device. As may be appreciated, the UAV 100 may include an imaging device (not shown) thereon, such as a digital camera, active laser sensor, thermal sensor, hyperspectral sensor, or other optical sensor, which may be directed downwards or otherwise in a direction facing a crop or plant in a field 110. Using theses sensors, the UAV 100 may capture images or spectral information of a field and crops 120 planted therein, for instance, as the UAV 100 flies over or otherwise navigates relative to a field 110. While the UAV 100 is shown as a multi-rotor copter, it is understood that images may be generated by imaging devices or other sensors attached to other aerial vehicles, moving overhead structures (e.g., irrigation equipment, such as an irrigation center pivot), or even satellites, which may be beneficial in satisfying particular image resolution requirements. In some embodiments, the UAV 100 can include a fixed wing device, a rotary wing device, an aerostat device, or other device.

Using images generated by the UAV 100, various characteristics of the crops 120 planted in the field 110 may be determined programmatically using computer vision, such as crop height, canopy cover, canopy volume, overall health, productivity, among other characteristics, as will be described. Notably, crop heights, for example, may be used to characterize a growth rate and health of a plant. A crop height may be defined as a difference between a top of a plant and the ground. Additional characteristics of the crop 120 may be determined, such as crop size or volume, whether the crop 120 is subject to abiotic or biotic stresses, as well as other information.

Figure 2:
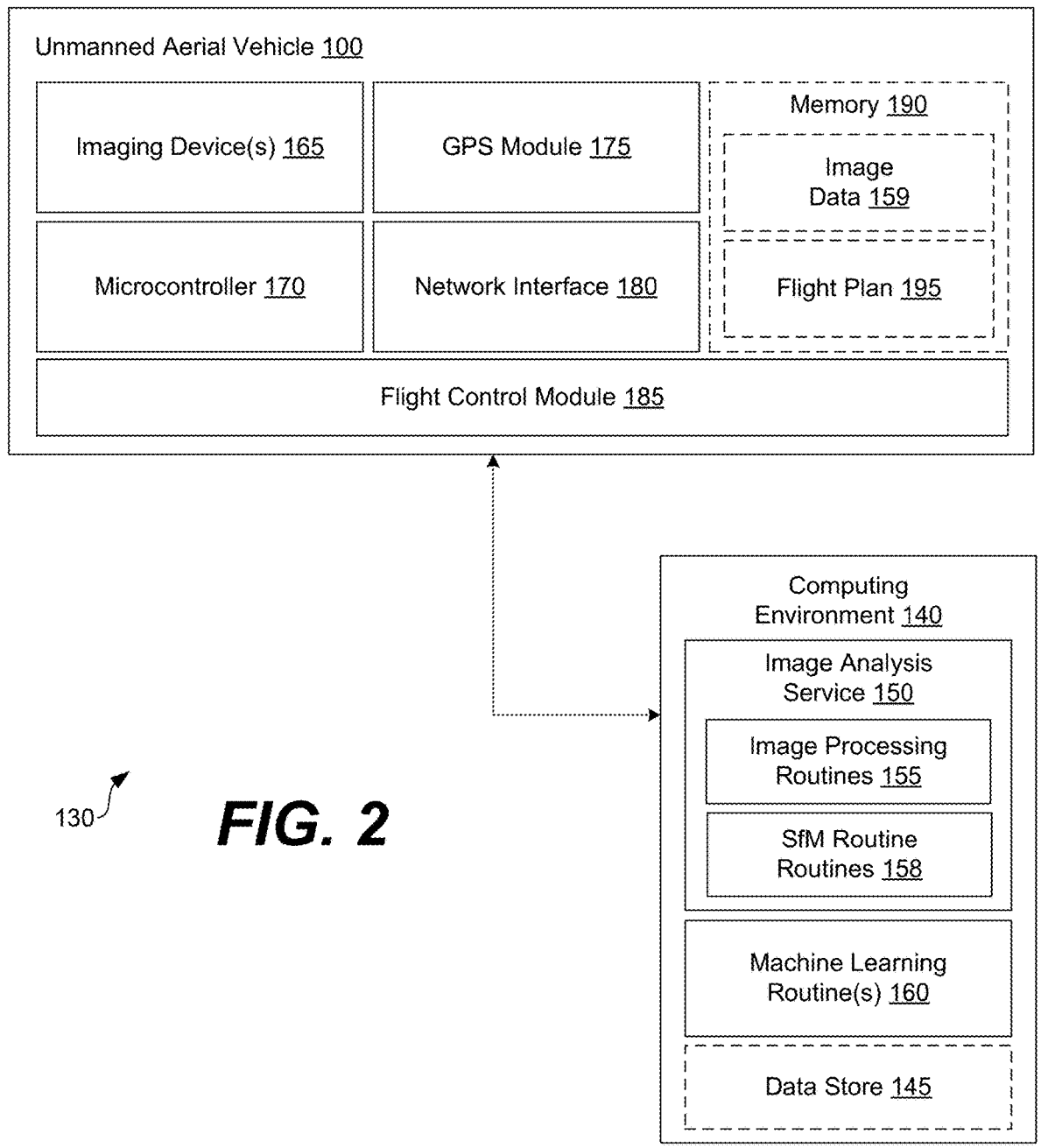
FIG. 2 shows an example of the components of the UAS as well as components of a computing environment used to extrapolate data from images generated by the UAS according to various embodiments.

With reference to FIG. 2, an example of a networked environment 130 is shown according to various embodiments. The networked environment 130 includes a UAS (such as the unmanned aerial vehicle 100) and a computing environment 140, which are in data communication with each other via a network. The network includes, for example, the Internet, intranets, extranets, wide area networks (WANs), local area networks (LANs), wired networks, wireless networks, or other suitable networks, etc., or any combination of two or more such networks. For example, such networks may comprise satellite networks, cable networks, Ethernet networks, and other types of networks.

The computing environment 140 may comprise, for example, a server computer or any other system providing computing capability. Alternatively, the computing environment 140 may employ a plurality of computing devices that may be arranged, for example, in one or more server banks or computer banks or other arrangements. Such computing devices may be located in a single installation or may be distributed among many different geographical locations. For example, the computing environment 140 may include a plurality of computing devices that together may comprise a hosted computing resource, a grid computing resource, and/or any other distributed computing arrangement. In some cases, the computing environment 140 may correspond to an elastic computing resource where the allotted capacity of processing, network, storage, or other computing-related resources may vary over time.

Various applications and other functionality may be executed in the computing environment 140 according to various embodiments. Also, various data are stored in a data store 145 that is accessible to the computing environment 140, as well as other individual users and computing devices such as laptops, smartphones, and tablets. The data store 145 may be representative of a plurality of data stores 145 as can be appreciated. The data stored in the data store 145, for example, is associated with the operation of the various applications and/or functional entities described below.

The components executed on the computing environment 140, for example, include an image analysis module 150 having one or more image processing routines 155, structure-from-motion (SfM) routines 158, associated therewith, as well as other applications, services, processes, systems, engines, or functionality not discussed in detail herein. The image analysis module 150 is executed to analyze image data 159 collected from a UAS to determine characteristics of one or more crops 120 planted in a field 110, as will be discussed. Additionally, the computing environment may include one or more machine learning routines 160 configured to execute thereon. The machine learning routines 160 may include an artificial neural network routine, a convolutional neural network routine, or other machine learning routine, as may be appreciated.

In some embodiments, the computing environment 140 may include, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The computing environment 140 may include a display, such as, for example, one or more devices such as liquid crystal display (LCD) displays, gas plasma-based flat panel displays, organic light emitting diode (OLED) displays, electrophoretic ink (E ink) displays, LCD projectors, or other types of display devices, etc.

The unmanned aerial vehicle 100 may include one or more imaging devices 165 (e.g., one or more cameras), a microcontroller 170, a global positioning system (GPS) module 175, a network interface 180, a flight control module 185, as well as memory 190 capable of storing image data 159 and/or a flight plan 195. In further embodiments, the UAV 100 may include red-green-blue (RGB) sensors, multispectral sensors, hyperspectral sensors, thermal sensors, LiDAR sensors, as well as sensor triggers and/or stabilizers (e.g. gimbal).

In some embodiments, the computing environment 140 may be executed to determine the optimal flight plan 195 for the UAV 100. For instance, in some embodiments, the flight plan 195 may be determined to optimize a collection of image data 159, or other data of interest pertaining to a crop 120 growing in a field 100. Additionally, in various embodiments, the computing environment 140 may use past data collected during a past flight to optimize the flight plan 195 for a future or current flight. Additionally, the flight plan 195 may be determined based at least in part on a type of the crop 120 to be imaged, a specific crop feature of interest, or a geographic region in which the crop 120 and/or the field 110 are located. As may be appreciated, the flight plan 195 may be uploaded to memory 190 the UAV 100 which may cause a flight of the UAV 100 to be initiated and performed in accordance with the flight plan 195.

Figure 3:
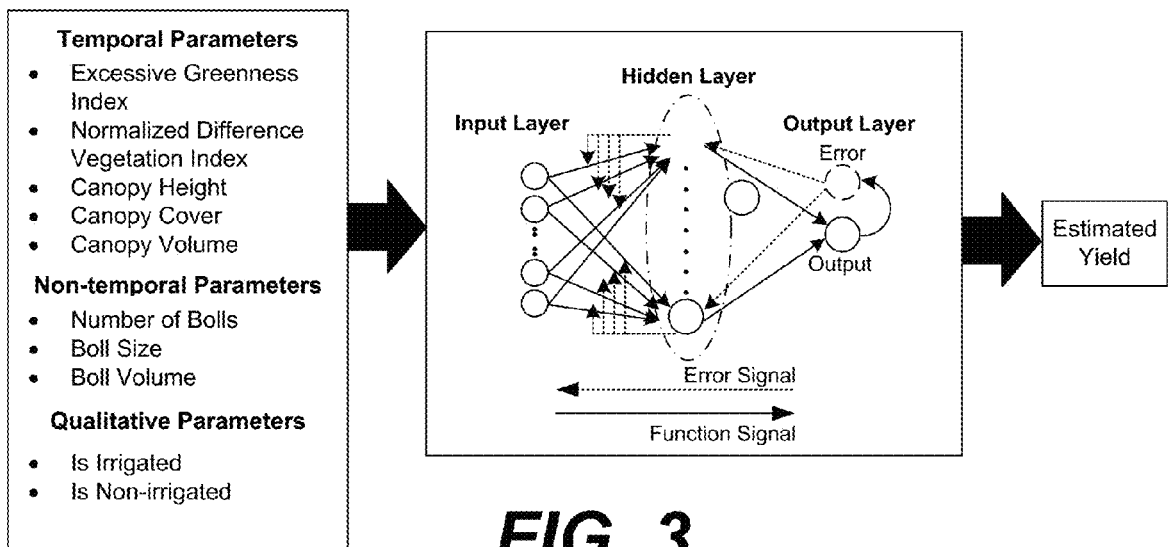
FIG. 3 shows a schematic diagram of an artificial neural network according to various embodiments.

Referring now to FIG. 3, a schematic diagram of a machine learning routine 160 is shown according to various embodiments. Specifically, in the non-limiting example of FIG. 3, the machine learning routine 160 includes an artificial neural network. The artificial neural network may include a routine executable by a hardware or virtual processor, as may be appreciated. A multi-layer perceptron (MLP) of an artificial neural network may contain one or more layers, such as one or more input layers and output layers. The artificial neural network may also include hidden layers. The hidden layers in the artificial neural network may include those between input layers and output layers. In the hidden layers, artificial "neurons," or logical units mimicking behavior of a biological neuron, take in a set of weighted inputs and produce an output through an activation function. As a result, the artificial neural network simulates activity that occurs in the human brain.

The input layer of the artificial neural network may be provided with various parameters, such as temporal parameters, non-temporal parameters, qualitative parameters, as well as other parameters. Temporal parameters can include canopy cover, canopy height, canopy volume, normalized difference vegetation index, excessive greenness index, as well as other temporal parameters. Non-temporal parameters with cotton as an example may include stand count, bloom count, boll numbers, boll size, and boll volume. Qualitative parameters may include whether a crop has been irrigated or non-irrigated. In any event, the parameters are provided to the input layer, which proceeds to the hidden layer. Ultimately, the output layer generates or forecasts an estimated yield of a crop, or a specific genotype thereof. An example configuration for an artificial neural network is shown in Table 1 below:

TABLE 1

Example of Parameter Selection of ANN Model

| Parameter | Value |
| --- | --- |
| Number of Hidden Layers | 1 |
| Hidden Layer Neurons | 20 |
| Training Method | Levenberg Marquardt |
| Training Percentage | 70% |
| Testing Percentage | 30% |
| Sampling Technique | Stratified |

As shown in FIG. 3, a network architecture may comprise three layers, namely an input layer, a single hidden layer, and an output layer. The input to the ANN may include a concatenated input feature vector, as will be described with respect to FIG. 5B, containing temporal and non-temporal crop canopy attributes and the qualitative attributes. While training the ANN model, concatenated input feature vector may be provided to the model in batches along with the machine harvested yield as a target feature. Initial weights may be assigned randomly and later updated by employing a back propagation routine using Adam optimizer to minimize a global error (mean square error). The Adam optimizer is known for its computational efficiency and its ability to deal with very noisy or sparse gradients. The training may be stopped when a satisfactory level of performance (e.g., a mean squared error (MSE) of 10−3) is achieved. The network with present weights may be used to predict the yield over the test samples. The MSE during a learning process may be calculated via:

$$\text{MSE} = \Sigma (Y_a - Y_p)^2 / n \qquad \text{(eq. 1)}.$$

where, $Y_a$ represents actual yield and $Y_p$ represents predicted yield.

To compare the efficacy of the ANN regression model employed herein, two reference machine learning regression methods were considered, namely, SVR and RFR. Support vector machines are popular machine learning models applied efficiently in various remote sensing applications that transform a non-linear regression problem into a linear regression problem with the help of kernel functions by mapping the original feature space into a new feature space. In embodiments described herein, a radial basis function (RBF) kernel may be used that is regarded as a comparatively better kernel function in handlining non-linearity in the input data. The model parameters ε (loss function) and C (error penalty factor) may be estimated empirically. Ensemble methods, such as random forest regression, are also very efficiently utilized in remote sensing applications. A random forest regression routine utilizes an ensemble of a large number of regression trees which are determined independently using a bootstrap sample of the data set, and later the final prediction is made using majority. RFR hyperparameters $n_e$stimator (the number of trees in the forest) and max$_d$epth (the maximum depth of the tree) may be determined empirically.

Figure 4:
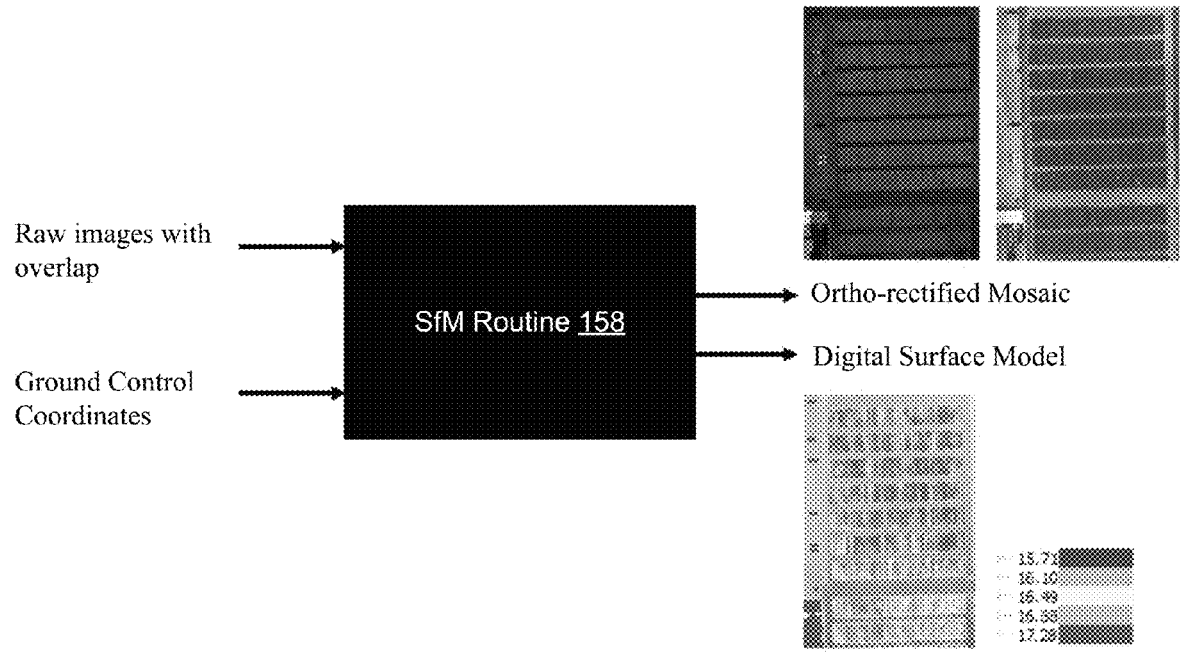
FIG. 4 includes a schematic diagram of preprocessing that may be used to obtain data that can be provided to the artificial neural network or other machine learning routine according to various embodiments.

Moving on to FIG. 4, a schematic diagram is shown that illustrates preprocessing that may be used to obtain data that can be provided to the artificial neural network or other machine learning routine 160 according to various embodiments. For instance, the SfM routine 158 may be used to generate an orthorectified mosaic and a digital surface model (DSM) of a field having a crop or plant planted therein, from which plant phenotypic characteristics may be extracted. The orthorectified mosaic and the digital surface model of the field may be generated using raw images and ground control coordinates as input data, as shown in FIG. 4.

Figure 5A:
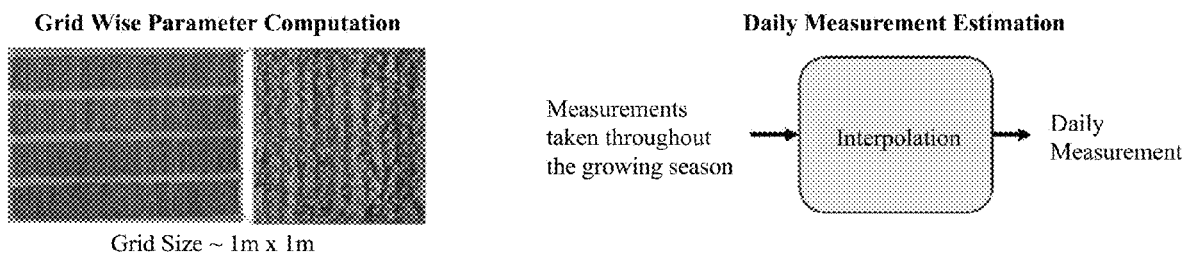
FIG. 5A shows an example of interpolating measurements taken throughout a growing season to daily measurements according to various embodiments.

With reference to FIG. 5A, an example of interpolating measurements taken throughout a growing season to daily measurements is shown according to various embodiments. Notably, daily estimates of each phenotype may be generated by interpolating phenotypic measurements from image data 159 acquired by the UAS. As may be appreciated, it may be beneficial to interpolate the data to generate a daily measurement (or a measurement for other suitable period of time) to apply models developed from past years to current data. Without interpolation, data collection timing may not be aligned. Hence, the model developed using past data may not be applied to the current data to predict crop yield. The interpolation may be performed by one or more of the image processing routines 155, for example.

Figure 5A:
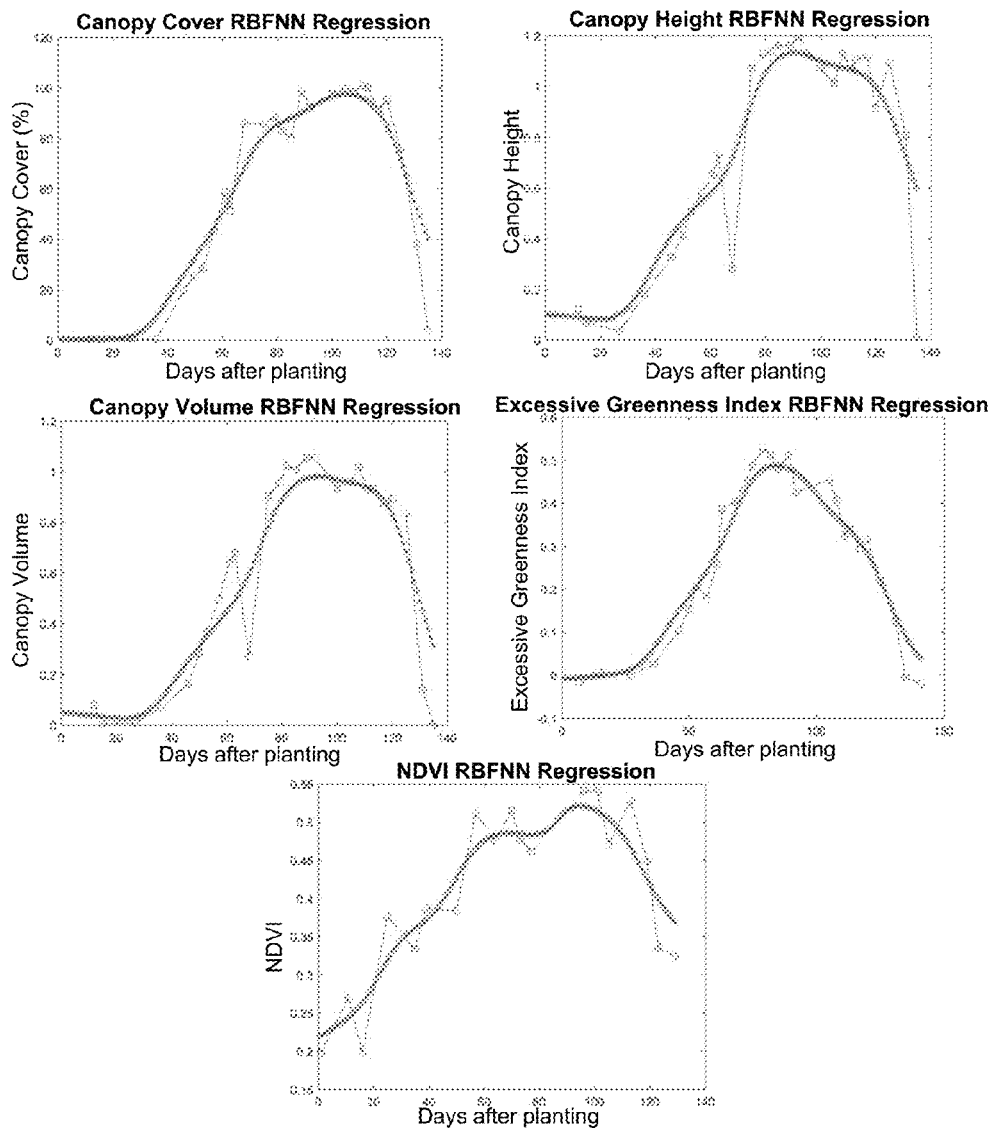
Figure 5B:
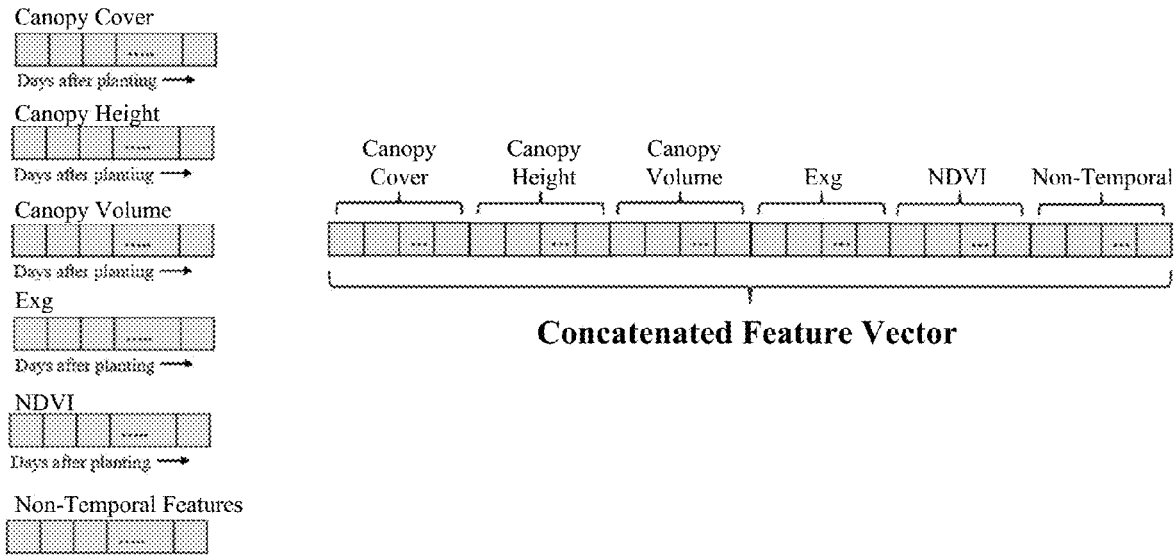
FIG. 5B shows an example of a feature vector that may be generated to provide data to the machine learning routine according to various embodiments.

Referring now to FIG. 5B, an example of a feature vector is shown that may be generated to provide data to the machine learning routine according to various embodiments. Vectors may include a logical element in programming languages that are used for storing data. In some embodiments, a concatenated feature vector may be generated by the computing environment 140 to provide to the machine learning routine 160. The concatenated feature vector may include a one dimensional vector in some embodiments, where the concatenated feature vector can be generated by combining vectors for characteristics of a crop or plant identified from data of the field, such as canopy cover, canopy height, canopy volume, etc.

Figure 6:
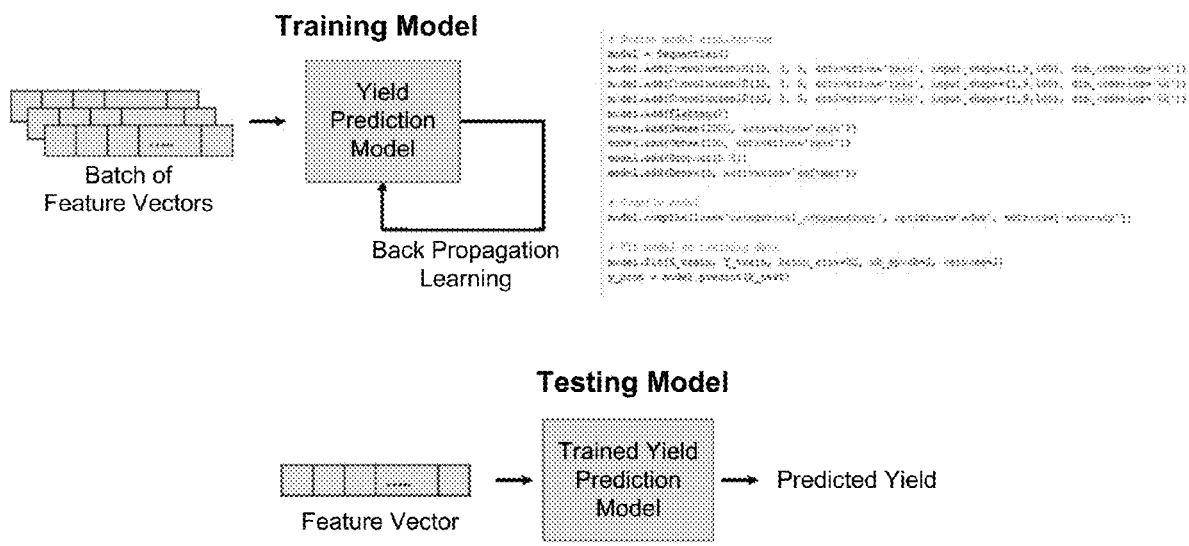
FIG. 6 shows an example of a training model that may be used to train the machine learning routine according to various embodiments.

Moving along to FIG. 6, an example of a training model is shown that may be used to train the machine learning routine 160 according to various embodiments. A batch of feature vectors may be used to train the artificial neural network or other machine learning routine 160, where the feature vectors may include data measured from crops in past experiments. As such, the machine learning routine 160 can identify correlations between various measurable characteristics of a crop during a growing cycle and actual yields of the crop. As may be appreciated, by training the machine learning routine 160 with actual yield data, the machine learning routine 160 is configured to forecast crop yields with a high-degree of accuracy, as will be shown.

Although ANNs tend to be prone to over-fitting in the course of training without careful parameter tuning, they have been found to be very efficient in identifying the importance of different independent variables for more accurate crop yield estimation. As such, in various embodiments, an ANN regression model is described consisting of three layers, such as an input layer, a hidden layer, and an output layer, as shown in FIG. 3. However, referring to FIG. 5B, traditional linear regression models lack the ability to model the data consisting of non-linear features. An ANN consists of a collection of simulated neurons placed in a multi-layer arrangement connected with other neurons via weighted links which help them deal with the non-linearity in the input data. ANNs are known to learn correlated patterns between inputs and the corresponding target. To prepare the input dataset using vegetation indices (Vis) and crop canopy attributes along with qualitative attributes of the field, a feature vector may be formed by concatenating weekly extracted values of all the temporal features followed by non-temporal and qualitative features, shown in FIG. 6, that constituted a vector size of seventy-five, with the machine harvested yield per plot used as a target feature. Training and test sets may be divided using a k-fold cross validation process to make the test results more meaningful and reliable. In a k-fold cross-validation process, the data may be randomly partitioned into k equal size sub samples. Each of the k sub samples may be considered as a validation set and the remaining sub samples are considered for training. The cross-validation process may then be repeated k times. The average of k results provides the test accuracy of the algorithm.

Figure 7:
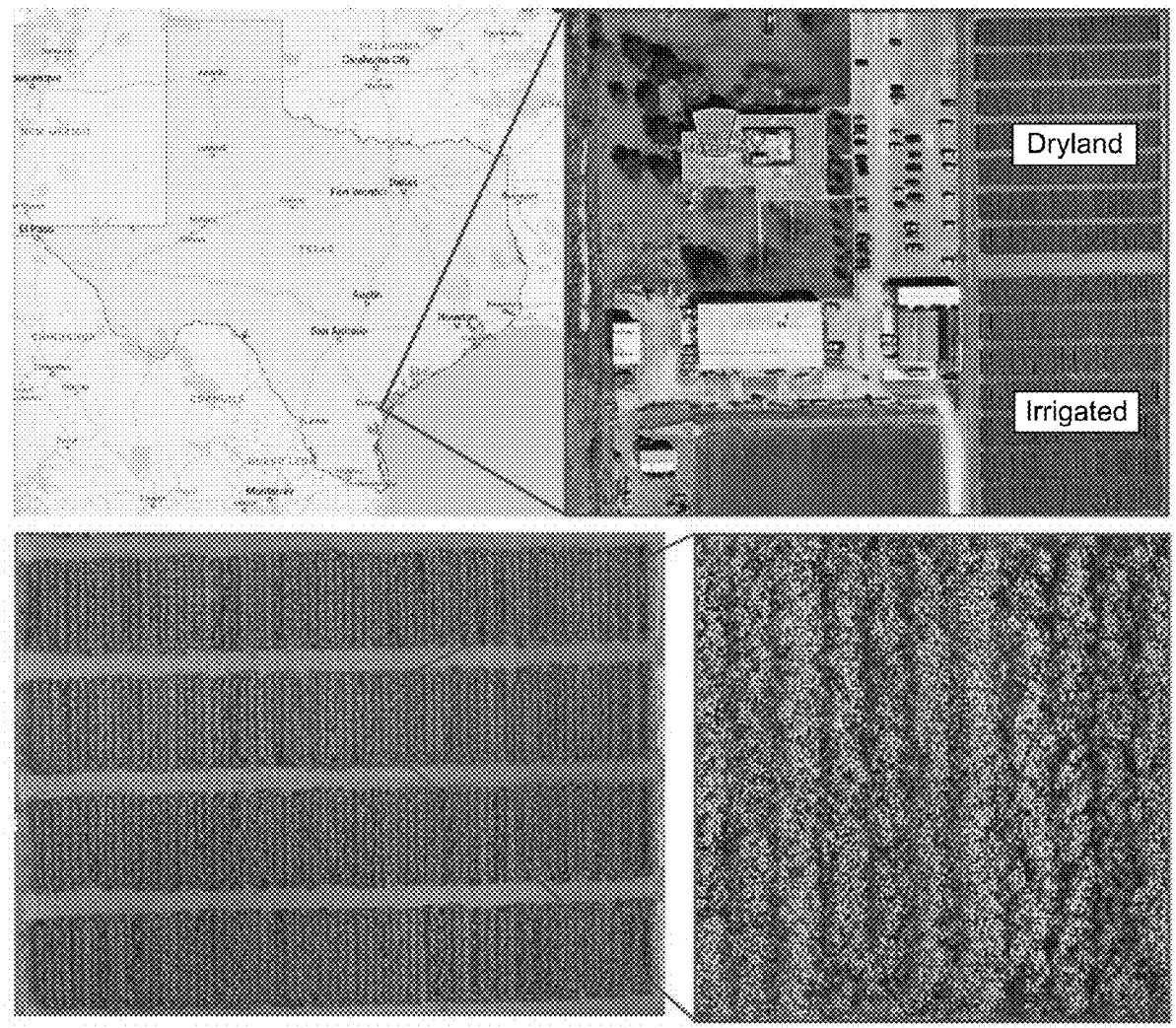
FIG. 7 shows an experimental field setup used for validating forecasted yield according to various embodiments.

FIG. 7 shows an experimental field setup used for validating forecasted yield according to various embodiments. More specifically, a field in Texas is shown planted with multiple varieties of cotton. Aerial images collected by an unmanned aerial system are shown. The image analysis module 150 may identify stand counts, bloom counts, boll counts, boll size, boll volume, and other characteristics of the cotton plants in the field. These characteristics may be described as a single concatenated feature vector, which may be provided to the machine learning routine 160. The machine learning routine 160 thereafter generates an estimated yield for an entirety of the crop and/or for specific genotypes planted in the field.

Establishing data boundaries around crop plots in aerial images is challenging to perform manually, but is crucial and important in obtaining quality, detailed crop information from UAS-derived images. A client application may be provided on a computing device, such as a personal computer, that allows an end user to establish plot boundaries useful in extracting data from the images. In various embodiments, an end user may select a base map layer of a project or area of interest and select a top-left corner (e.g., or other suitable area) where the end user desires to draw a first boundary.

The end user may provide minimal parameters, such as plot dimensions, rotation angle, and number of columns and rows to automatically generate data boundaries, illustrated as grids shown in the lower images of FIG. 7. In other words, the boundaries are visually represented on a display screen and additional fine-tuning may be performed by the end user, if needed. A user may select an individual square (or other region) in the grid to identify plant or canopy characteristics determined for that region by the image analysis module 150. The grid may be used in determining canopy cover, or other characteristics, at a certain date and/or over time, of a crop 120, as may be appreciated.

Figure 8:
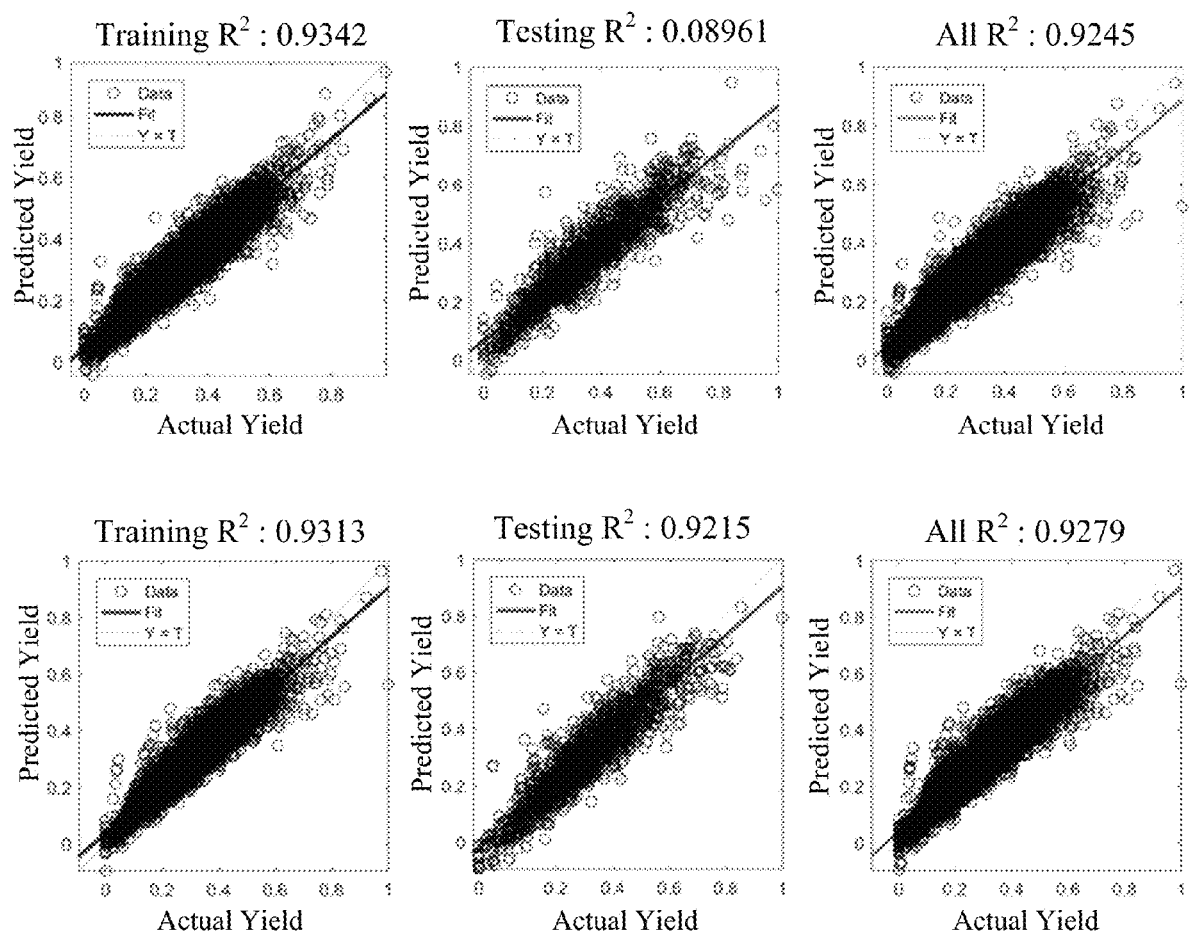
FIG. 8 shows graphs that describe performance of the artificial neural network in forecasting yield where a predicted yield is plotted relative to an actual yield according to various embodiments.
Figure 9:
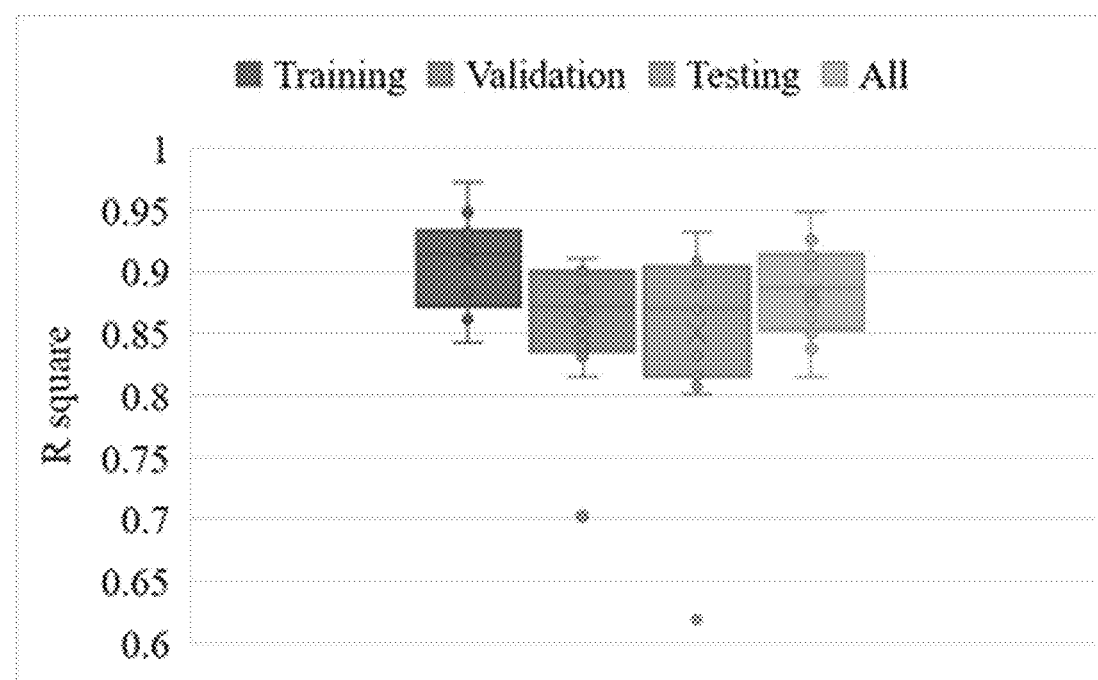
FIG. 9 shows a graph describing performance of the artificial neural network in forecasting yield according to various embodiments.
Figure 10:
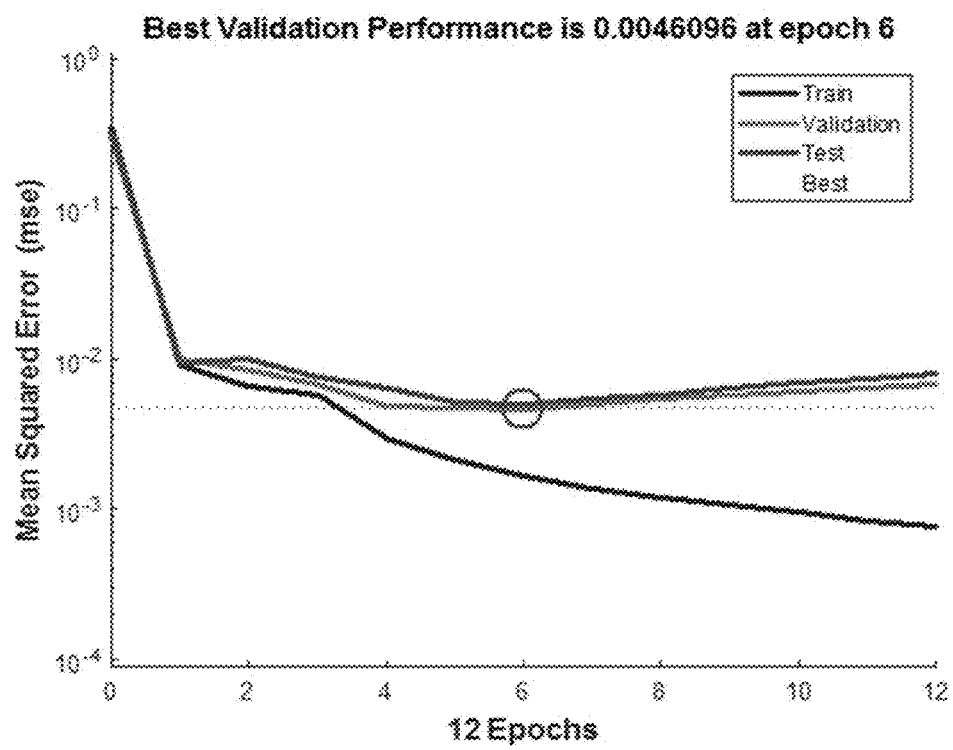
FIG. 10 shows another graph describing performance of the artificial neural network in forecasting yield according to various embodiments.
Figure 11:
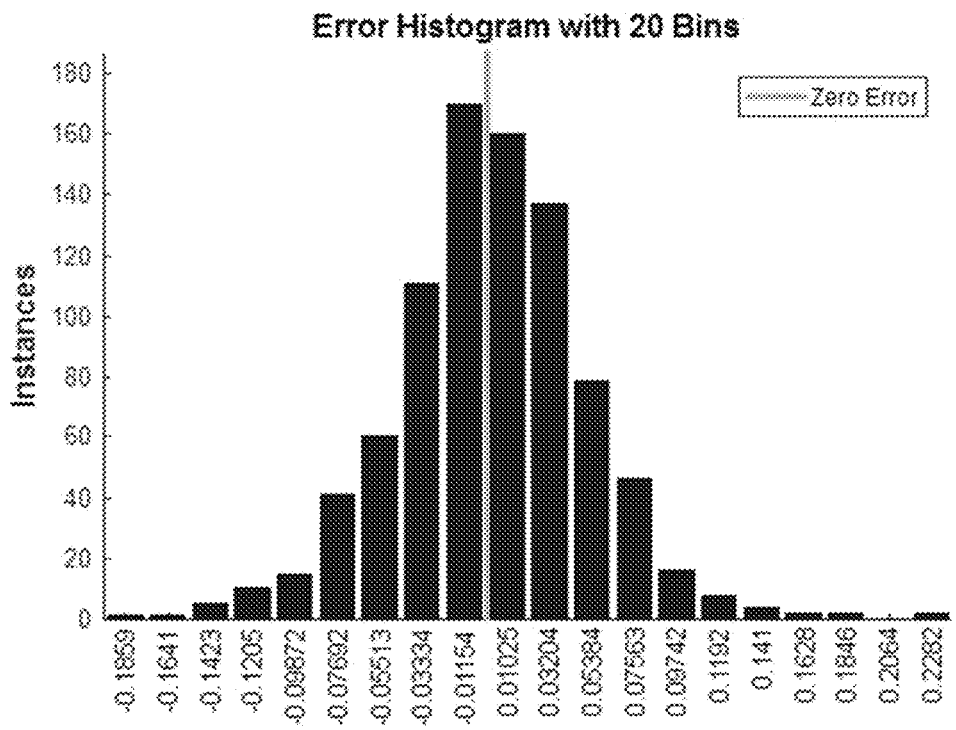
FIG. 11 shows another graph describing performance of the artificial neural network in forecasting yield according to various embodiments.

In FIG. 8, graphs are shown describing performance of the artificial neural network in forecasting crop yield using different R-squared values where an R-squared value is a statistical measure of how close a data point is to a fitted regression line. Specifically, each graph includes predicted yield values plotted relative to actual yield values according to various embodiments. As can be seen, the predicted yield generated by the machine learning routine 160 is very close to the actual yield. FIGS. 9, 10, and 11 similarly show the forecasted yield being very similar to the actual yield. Average R-squared values for 20 iterations of the machine learning routine 160 are shown in Table 2 below:

TABLE 2

| Average R-squared Values for 20 Iterations | |
|---|---|
| Estimators | Values |
| $R^2$ value for Training | 0.9082 |
| $R^2$ value for Testing | 0.8512 |
| $R^2$ value for Validation | 0.8608 |
| $R^2$ value for All Samples | 0.8835 |

As such, the embodiments described herein are able to predict crop yield with an R-squared value of around 0.9. Forecasting crop yields will help plant breeders choose the best genotypes, for instance, without need of harvesting an entire field. Moreover, plant breeders can increase a size of an experiment with little to no additional manual labor requirements. Agricultural scientists will have better understanding about the crop features responsible for the best performance.

Figure 12:
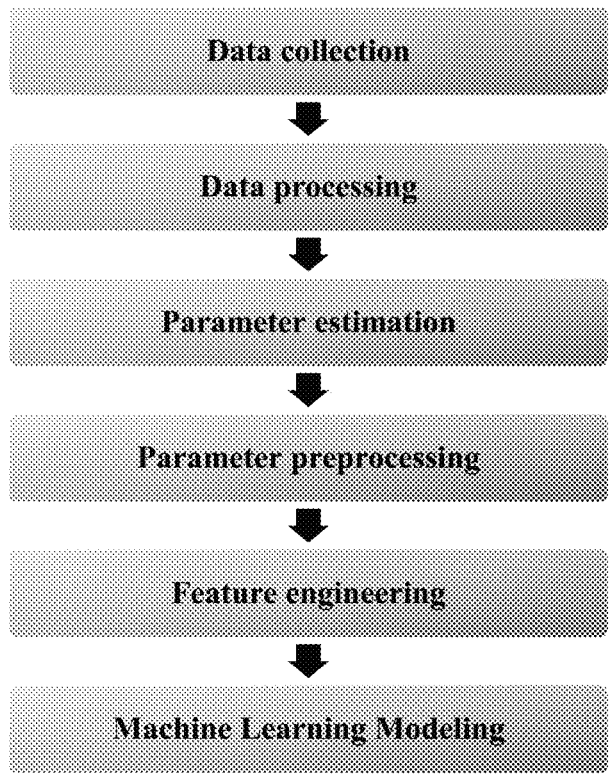
FIG. 12 shows a flowchart illustrating an example of forecasting an estimated yield for a crop or plant using images collected by the UAS according to various embodiments.

FIG. 12 shows a flowchart illustrating an example of forecasting an estimated yield for a crop or plant using images collected by an unmanned aerial system according to various embodiments. First, a data collection process may be performed, which may include flying or otherwise navigating a field with an unmanned aerial system such that image data 159 and other sensor data may be collected. In some embodiments, image data 159 may be collected at different periods of time during a growing cycle.

Next, a data processing process may be performed, which may include applying a structure-from-motion routine, as discussed above in FIG. 4. Specifically, a structure-from-motion photogrammetry application may be used to generate an orthorectified mosaic image and a digital surface model of the field having the crop or plant planted therein. The orthorectified mosaic image and the digital surface model of the field may be generated using raw images and ground control coordinates as input data. An orthorectified mosaic image may include an aerial image geometrically and radiometrically corrected such that the scale of the image is uniform and such that the image is an accurate representation of a field on the surface of the Earth, having been adjusted for topographic relief, lens distortion, camera tilt, and other issues. Distortion may be adjusted when generated the orthomosaic image, such as distortion caused by non-static plant (e.g., a plant swaying in the wind or otherwise moving) during UAS data collection using a UAS, such as a manned or unmanned aerial or terrestrial platform. Distortion in the orthomosaic image may make it challenging to perform extraction of certain features (e.g. sorghum panicle counting and size estimation and boll and bloom counts in cotton).

Thereafter, a parameter extraction process may be performed. The parameter extraction process may include extracting characteristics or other parameters from the orthorectified mosaic images and/or digital surface model. One or more of the characteristics may include canopy cover, canopy height, canopy volume, normalized difference vegetation index, excessive greenness index, irrigated, non-irrigated, etc. In instance in which the crop or plant includes cotton, one or more of the characteristics may include cotton boll count, boll size, and boll volume.

Next, the computing environment 140 may perform a parameter preprocessing process. The parameter preprocessing process may include interpolating data based on measurements of the characteristics taken at different periods of time using an interpolation routine to generate a daily measurement for each of the plurality of characteristics at a predefined sequence. For instance, assume that images of a field were collected every other week and parameters of the crop planted in the field was determined for every other week. The measurements of the crop taken every other week can be interpolated to obtain a daily measurement for the crop. As may be appreciated, the daily measurement may be beneficial for use by the machine learning routine 160, as well as enabling multi-year comparisons.

Next, a feature engineering process may be performed which may include concatenating the vectors to generate a concatenated feature vector, as shown in FIG. 5. Finally, the machine learning modeling process may be performed. The machine learning modeling process may include passing the concatenated feature vector, or each feature vector as an input to the machine learning routine along with other potential inputs, such as weather data. The machine learning routine 160 generates an estimated yield of the crop at a predetermined harvest data, which may be used in making a recommendation or comparison between two genotypes or identifying genotypes that may be at risk to certain conditions, such as disease.

Figure 13:
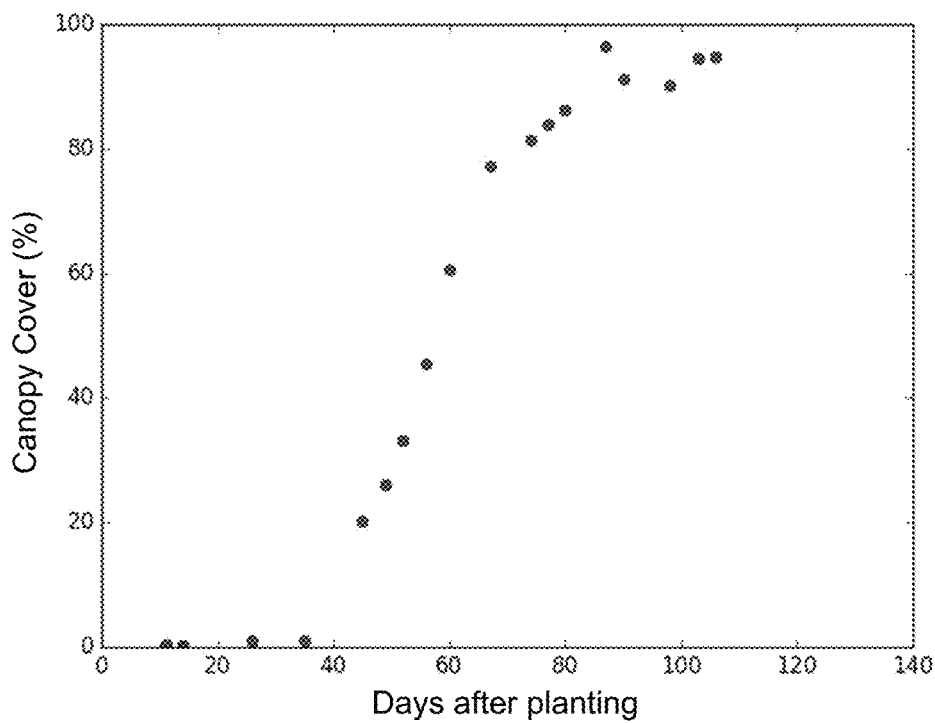
FIGS. 13-14 show an example of a data collection timeline for canopy cover according to various embodiments.
Figure 14:
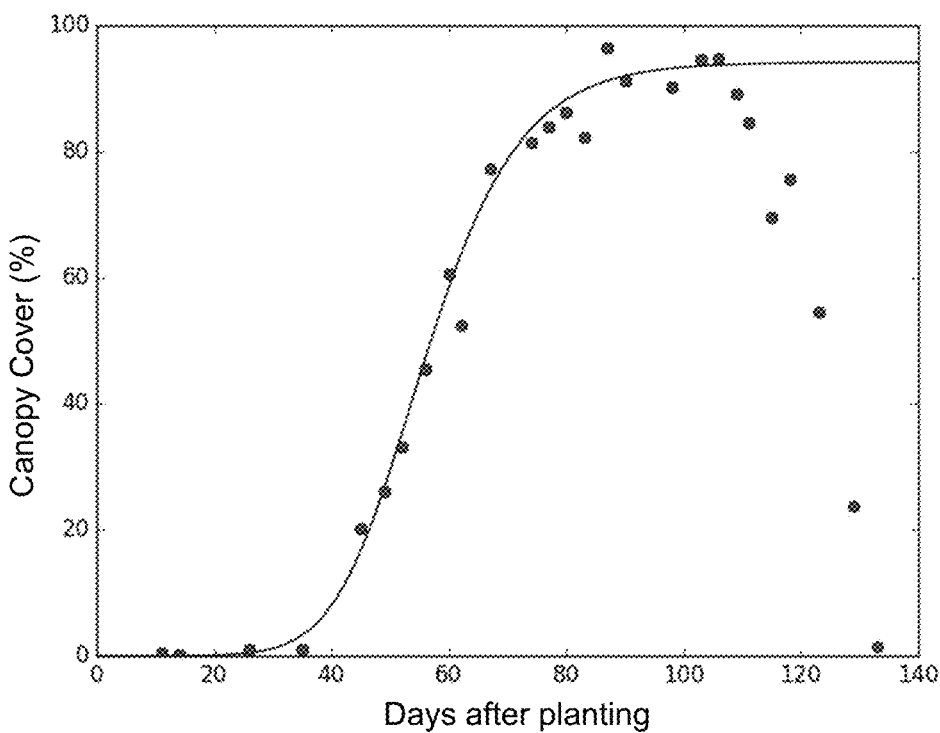

Turning now to FIG. 13 and FIG. 14, charts are shown illustrating an example of a data collection timeline for canopy cover according to various embodiments. Specifically, the charts plot data points for canopy cover (in percentage) versus days after planting. The data was collected in an experiment performed ranging from May to August. While FIGS. 13 and 14 illustrate canopy cover, it is understood that other factors can be determined, such as canopy height, canopy volume, normalized difference vegetation index, excessive greenness index, irrigated, and non-irrigated, etc., from which additional information regarding rate and timing of crop growth and development may also be extracted.

Figure 15:
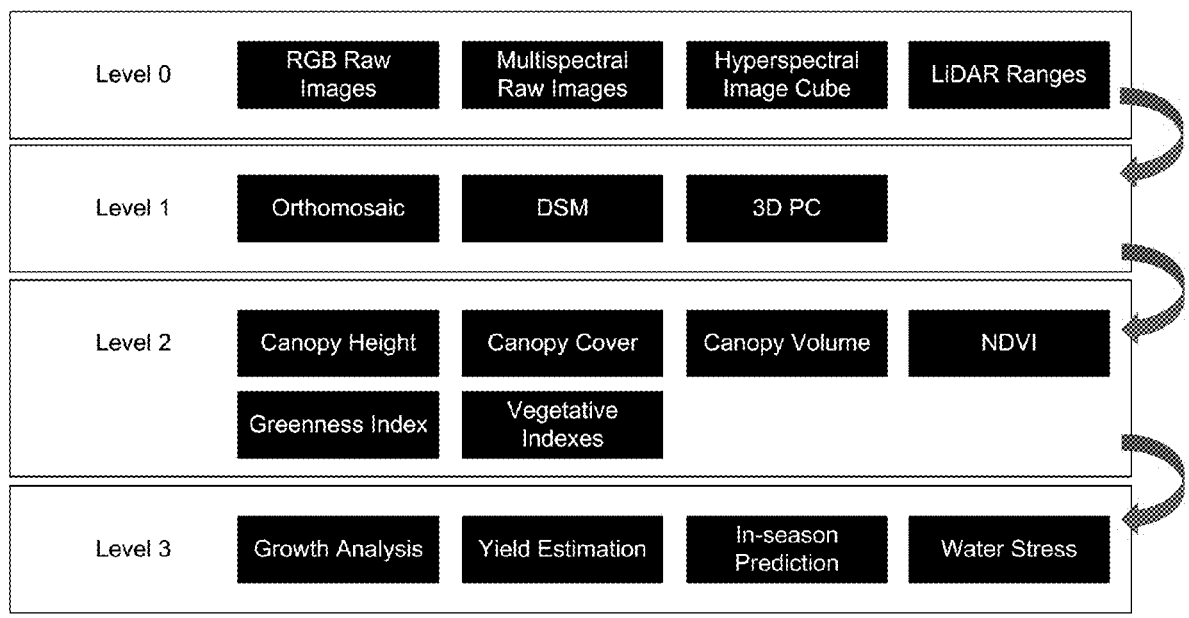
FIG. 15 shows a data processing workflow according to various embodiments.

FIG. 15 shows a data processing workflow according to various embodiments. At Level 0 (e.g., Step 1), RGB raw images, multispectral raw images, thermal raw images, hyperspectral image cube(s), LiDAR ranges, and/or other information are obtained. At Level 1 (e.g., Step 2), a computing device can be configured to generate an orthomosaic image or map, a digital surface model (DSM), three-dimensional reconstructions, and/or other data products from which data can be extracted or utilized.

At Level 2 (e.g., Step 3), various data can be derived from the orthomosaic image or map, a digital surface model (DSM), three-dimensional reconstructions, and/or other data products generated at Level 1. For instance, canopy cover, canopy height, canopy volume, normalized difference vegetation index, greenness index, vegetative indexed, irrigated, non-irrigated, and/or other properties can be measured or otherwise determined. At Level 3 (e.g., Step 4), the data generated at Level 2 can be used to determine a growth analysis, a yield estimation, an in-season prediction, a management recommendation, water stress, and/or other analyses as can be appreciated. The disclosure is not limited herein to these analyses. Based on these analyses, a determination can be made, for instance, whether to apply water to a crop, harvest the crop, apply a growth promoter or regulator agent to the crop, or other task to optimize a crop output as can be appreciated.

Figure 16A:
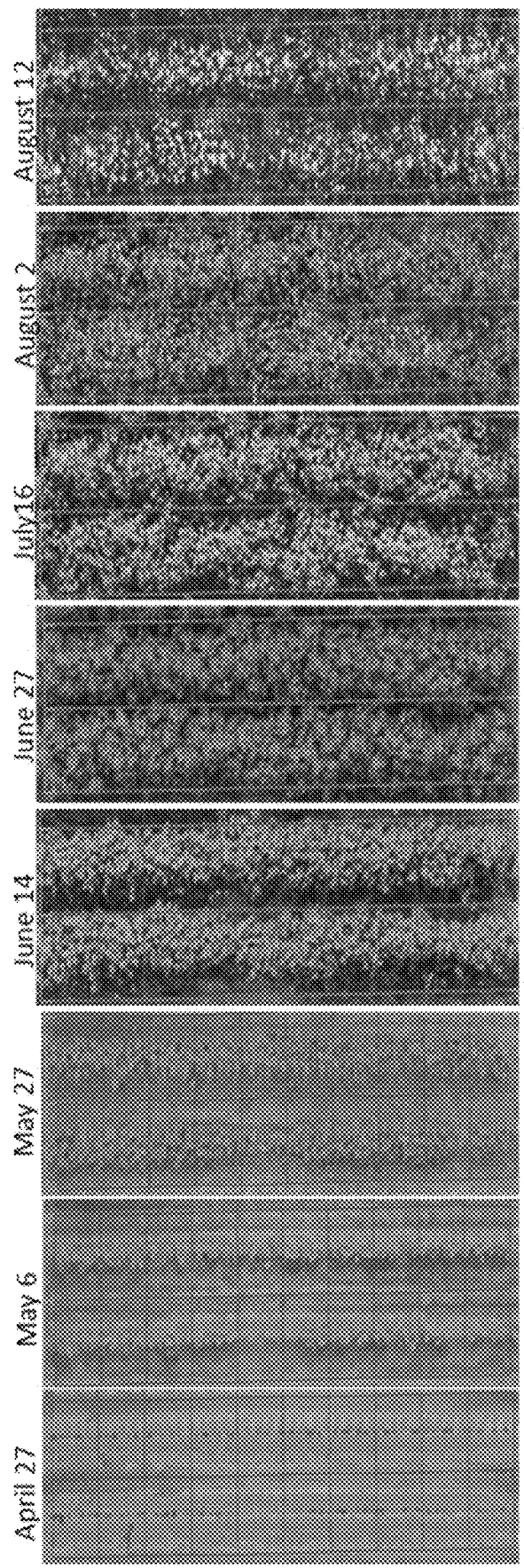
Figure 17:
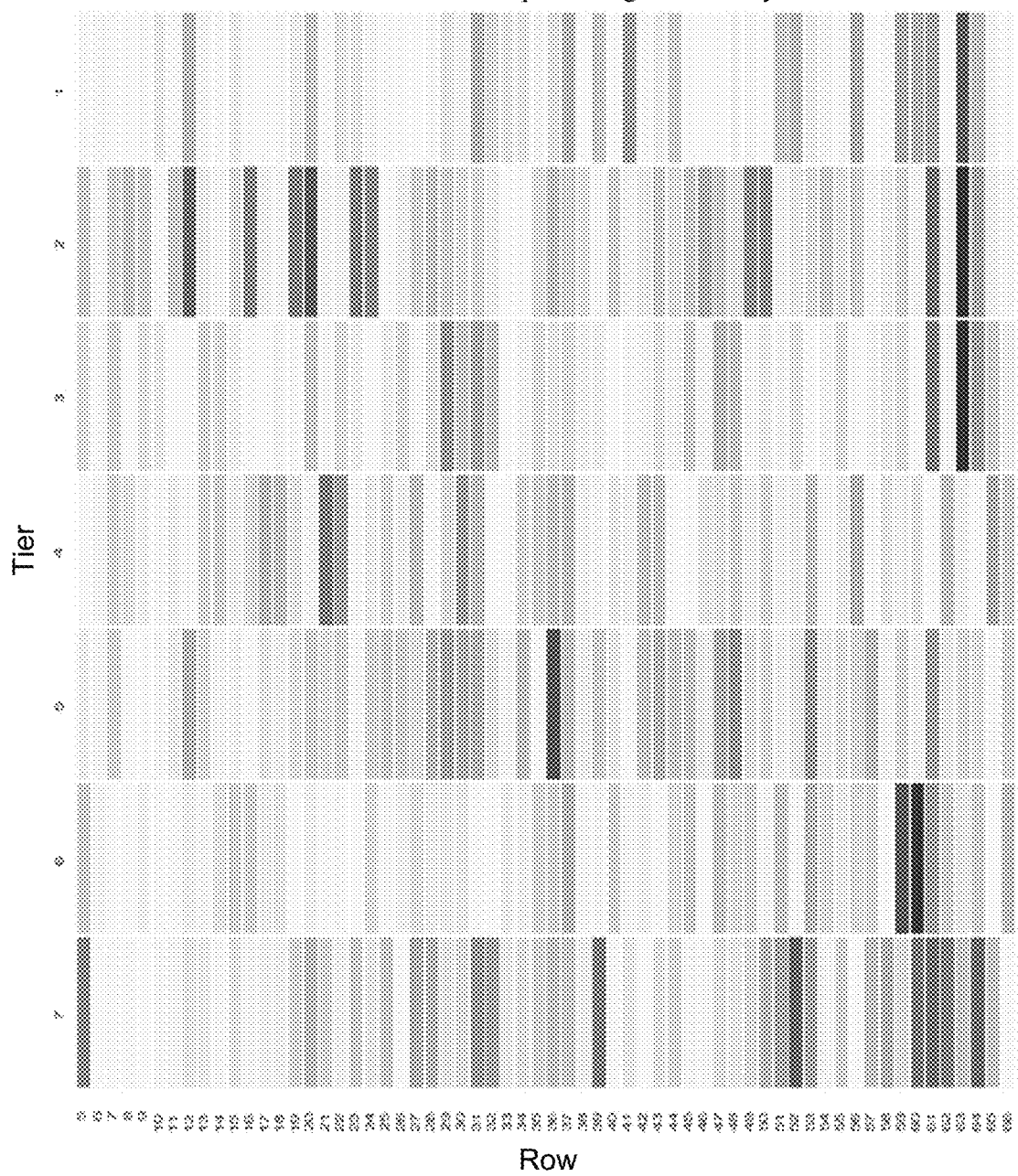
FIGS. 17 and 19 show an actual yield map according to various embodiments.

Referring next to FIGS. 16A-16B, various charts are shown in FIG. 16B where the data used to generate the charts are extracted from aerial images shown in FIG. 16A. Specifically, a first chart depicts a canopy cover radial basis function neural networks regression, a second chart depicts a canopy height radial basis function neural networks regression, a third chart depicts a canopy volume radial basis function neural networks regression, a fourth chart depicts an excessive greenness index radial basis function neural networks regression, and a fifth chart depicts an NDVI radial basis function neural networks regression. As can be appreciated, a radial basic function neural network is an artificial neural network that uses radial basis functions as activation functions, and a radial basic function neural network can be used to forecast canopy cover, canopy height, canopy volume, excessive greenness index, NDVI, or other metrics.

Figure 18:
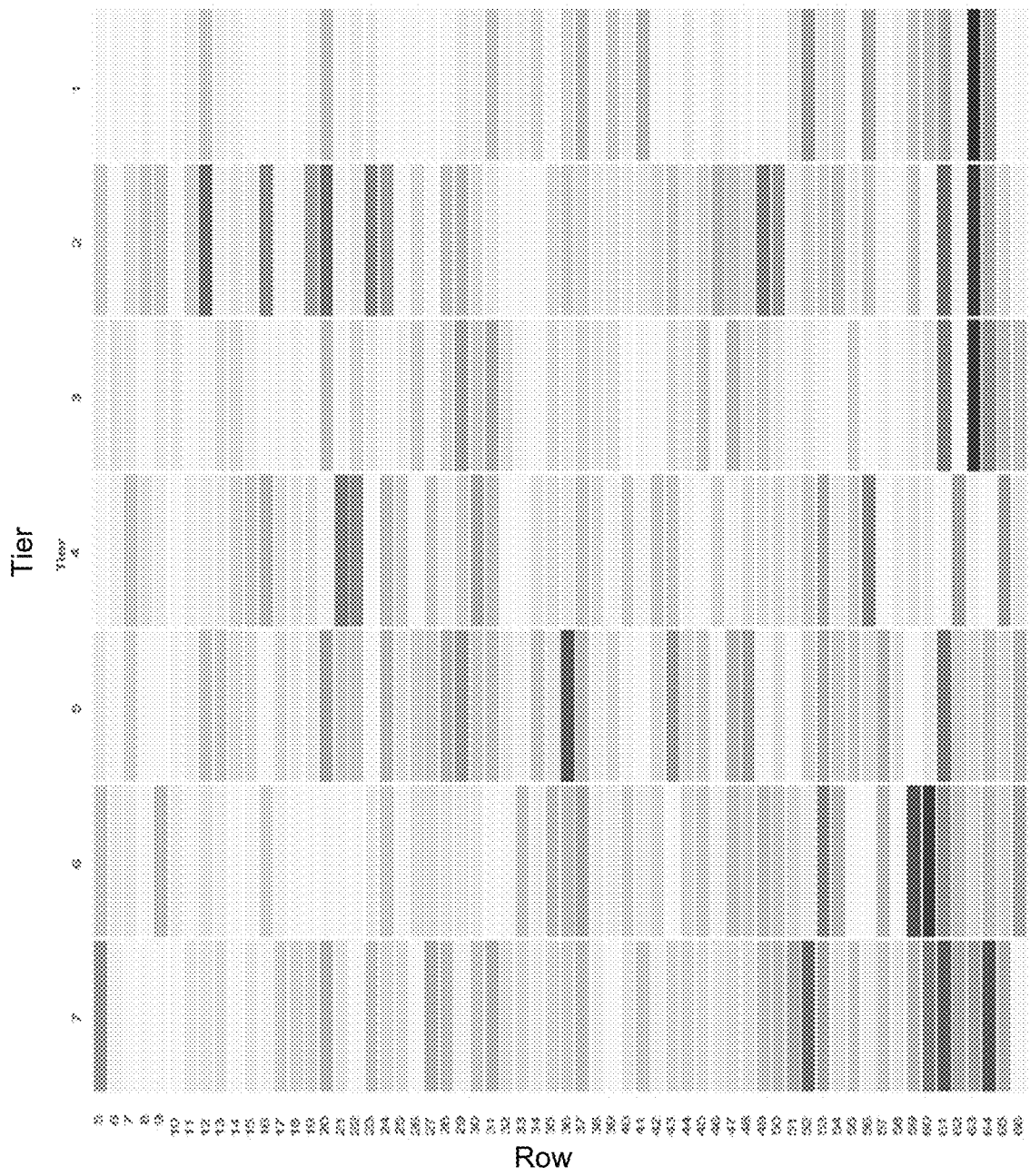
FIGS. 18 and 20 show a predicted yield map according to various embodiments.
Figure 18:
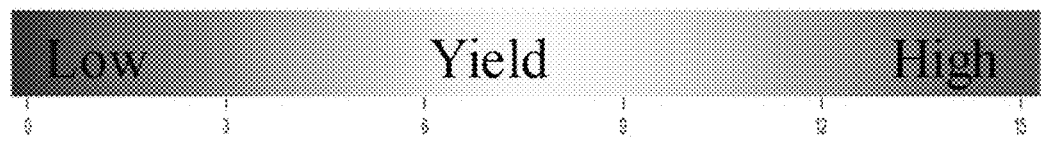
Figure 19:
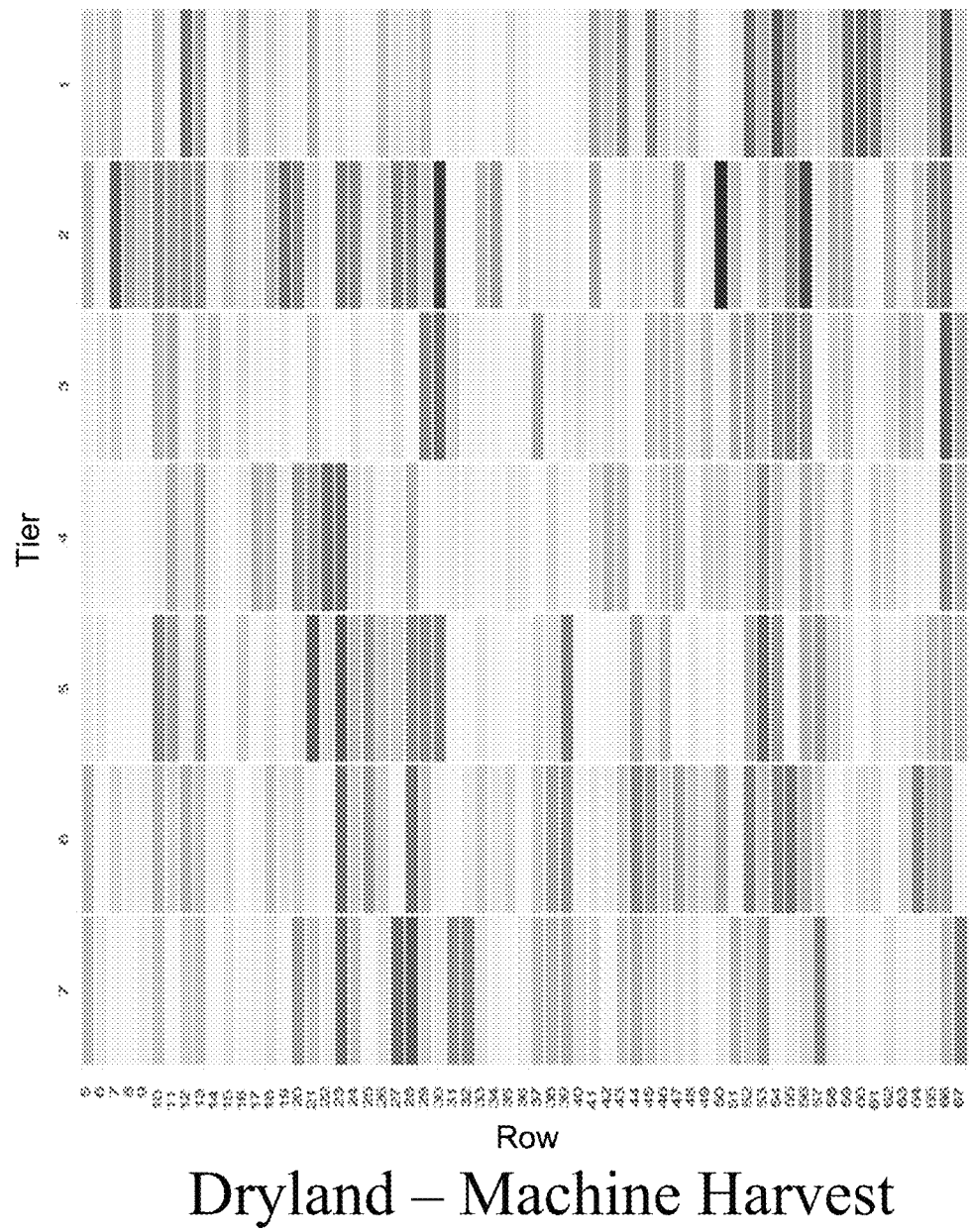
Figure 19:
Figure 20:
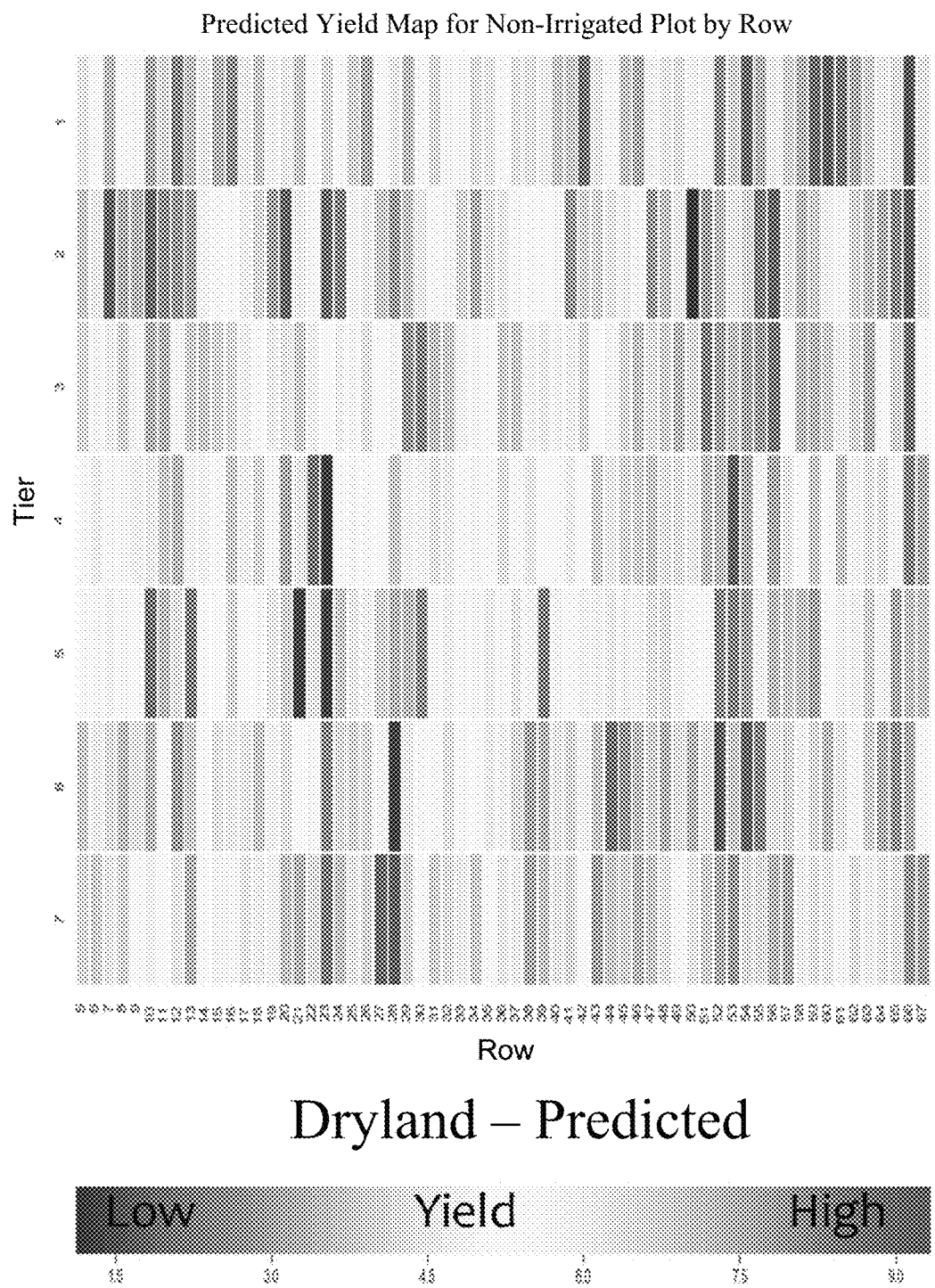

Turning now to FIGS. 17-20, FIGS. 17 and 19 show an actual yield map while FIGS. 18 and 20 show a predicted yield map according to various embodiments. Based on an inspection of FIGS. 17 and 18, for example, a predicted yield generated in accordance with the embodiments described herein in very similar to an actual yield determined for irrigated plots by row. Similarly, based on an inspection of FIGS. 19 and 20, the predicted yield generated in accordance with the embodiments described herein in very similar to the actual yield determined for irrigated plots by row.

Figure 21:
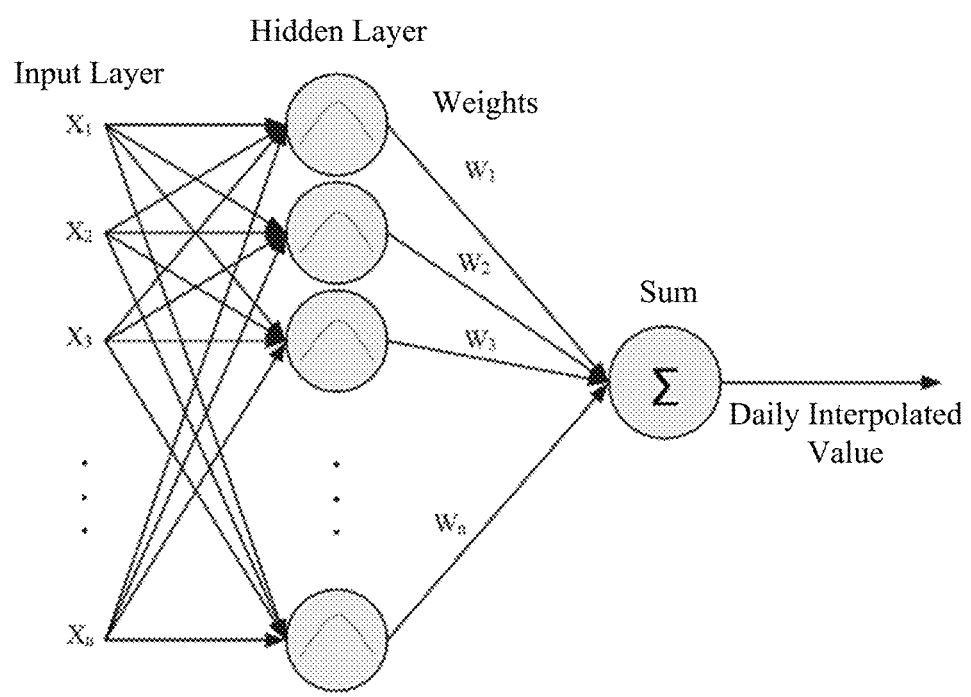
FIG. 21 shows an example architecture of a radial basis function neural network-based regression model according to various embodiments

Turning now to FIG. 21, an example architecture of a radial basis function neural network-based regression model is shown according to various embodiments. UAS data collection tends to be dependent on various factors such as availability of the crew, availability of resources, weather conditions, and in case of data collection over a crop field, availability of the field is also a concern. As a result, maintaining a uniform time interval between UAS flights may be difficult. To resolve this issue, an interpolation technique can be used to determine daily estimates for crop canopy attributes from which measurements at any uniform interval can be extracted.

In some embodiments, a radial basis function neural network-based regression model may be used for daily measurement estimation or measurement estimation for other desired time period. RBFNNs include single pass learning models with high accuracy interpolation capability which can efficiently handle noise in the input data. As a special type of neural network, similar to a two-layer ANN, RBFNNs include an input layer fully connected to a hidden layer with a Gaussian radial basis function as the activation function, as shown in FIG. 21. Each input vector is supplied to each basis in the hidden layer, and the output of the hidden layer is used to compute a weighted sum to get the output. RBFNN can learn to approximate the underlying trend using many Gaussians curves. Shapes of curves are adjustable by changing the weights or centers.

Figure 22:
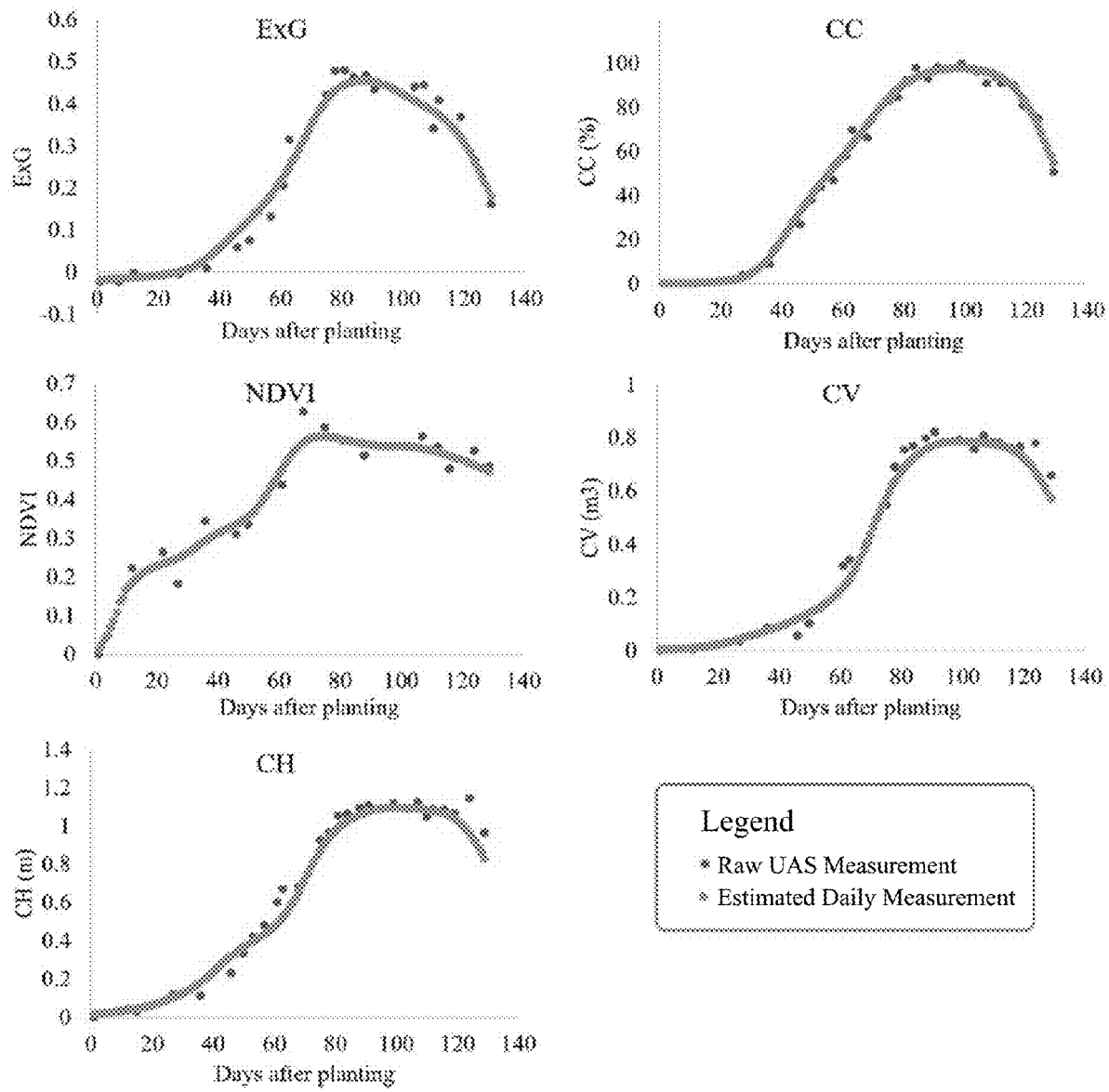
FIG. 22 shows daily measurement estimation of canopy attributes from UAS-based measurements using radial basis function neural network (RBFNN) for a plot according to various embodiments.

FIG. 22 shows daily measurement estimation of canopy attributes from UAS-based measurements using radial basis function neural network (RBFNN) for a plot according to various embodiments. Using the RBFNN, daily measurements may be interpolated from non-uniform UAS based measurements. The estimated daily measurements address some of the variability found in UAS based measurements, shown in FIG. 22, which are often caused by noise, flight, and weather conditions.

Figure 23:
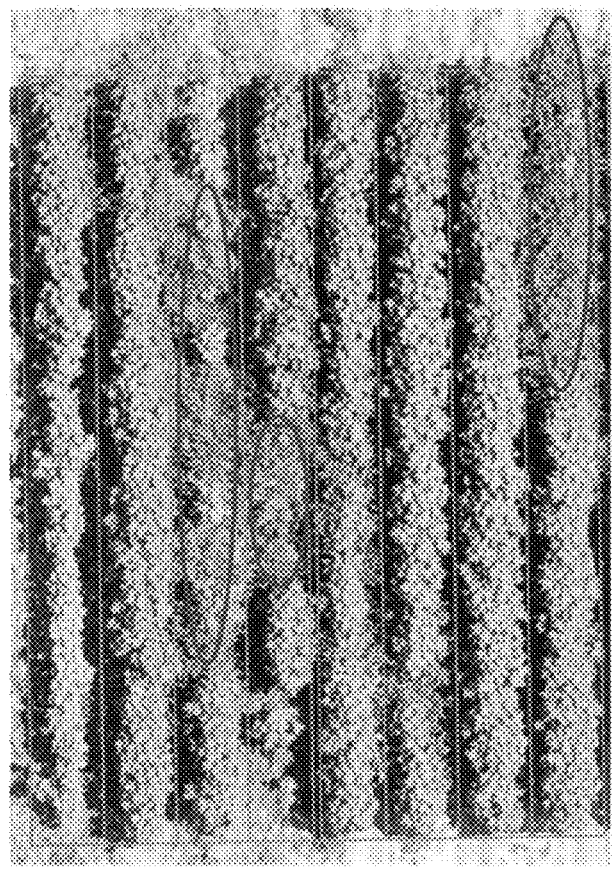
FIG. 23 shows an aerial image that depicts the presence of non-target plants (e.g., weeds) in the plots indicated by the curved boundaries.

For the charts shown in FIG. 22, crop features were extracted for every five days from the estimated daily measurements for use as input into the prediction model. After extracting attributes at a weekly interval, concatenation was performed to form a feature vector, shown in FIG. 5B. In some cases, the presence of weeds (e.g., a non-target plant) may introduce error to the model. Plots containing excessive non-target plants were removed from the analysis after a careful visual inspection. Weed infestation was observed for some of the plots, as shown in FIG. 23. Specifically, FIG. 23 shows the presence of non-target plants in the plots (indicated by the rounded boundaries).

To develop the ANN model, training was performed using 564 samples (70%) out of 805 samples. An empirical evaluation was performed to determine ANN hyperparameters. To determine the optimum number of hidden layers and the number of neurons in the hidden layers, one to three hidden layers with five to fifteen neurons were initially considered. The network performance was evaluated over the training and test sets using coefficient of determination and MSE.

The experiments revealed that one hidden layer with ten neurons was sufficient for the dataset. For higher number of hidden neurons and layers, the model performance was increased over the training set and decreased over test set, indicating the overfitting of the model due to overparameterization. Selected hyperparameters are presented in Table 3, below.

TABLE 3

Example of Parameter Selection of ANN Model

| Parameter | Value |
| --- | --- |
| Number of Hidden Layers | 1 |
| Hidden Layer Neurons | 10 |
| Training Method | Adam Optimizer |
| Activation Function | Hyperbolic Tangent Sigmoid |
| No. of folds (k) for Cross-Validation | 10 |

Figure 24:
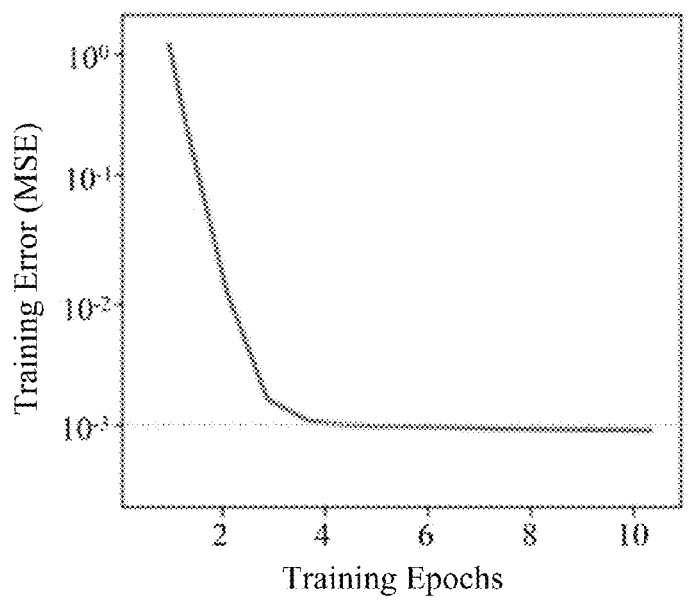
FIG. 24 is a chart showing performance of an artificial neural network for training for one of the instances of k-fold where the x-axis represents iterations and the y=axis represents training mean square error (MSE).

To ensure that the ANN was trained and tested over a wide range of yield values, stratified sampling method was used to select the samples for training and testing. The predictive accuracy of the ANN model was evaluated using MSE and coefficient of determination (R2) using 10-fold cross validation. FIG. 24 presents the training performance of one of the training instances of 10-folds where the training performance was found to be maximum.

Figure 25:
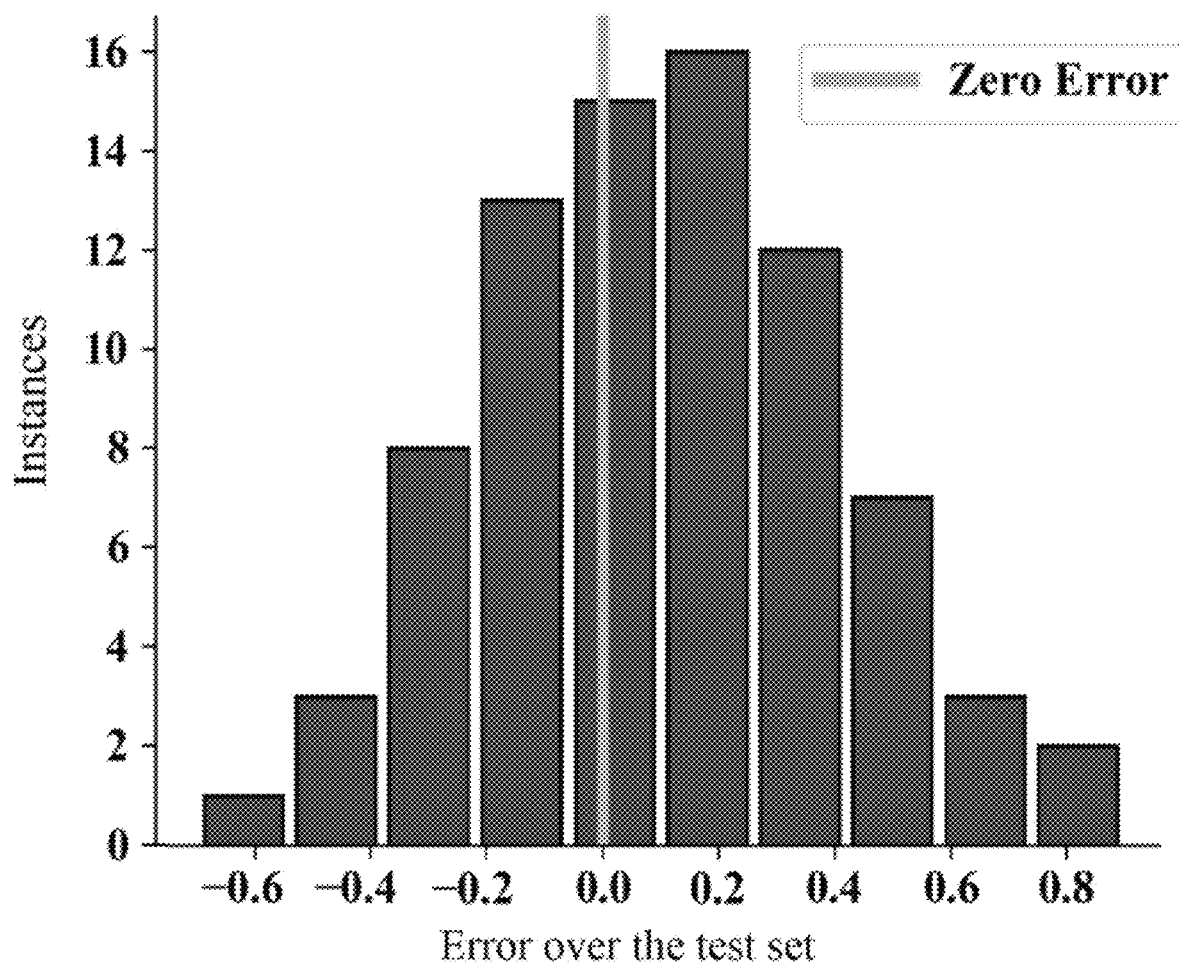
FIG. 25 depicts an error histogram of the residual between a predicted and an actual yield according to various embodiments.

During the training of the network the error consistently decreased over time to approximately 10–3 at the 4th epoch. The error histogram over the test set for the same training instance is presented in FIG. 25 which indicates that residuals centered around zero following a normal distribution, suggesting that errors were statistically random. The observed and estimated values revealed that there was a good correlation between actual and predicted yield values, with the exception of a few outliers, indicating a good performance of the ANN model. Performance assessment of the model using 10-fold cross validation included best and the average of coefficient of determination and MSE for 10-folds, shown in Table 4 below.

TABLE 4

Model Performance Assessment

| Estimators | Best of 10-Folds | Average of 10-Folds |
| --- | --- | --- |
| $R^2$ Value for Training | 0.934 | 0.918 |
| $R^2$ Value for Testing | 0.898 | 0.861 |
| MSE for Training | 0.0015 | 0.0023 |
| MSE for Testing | 0.0025 | 0.0049 |

Figure 26:
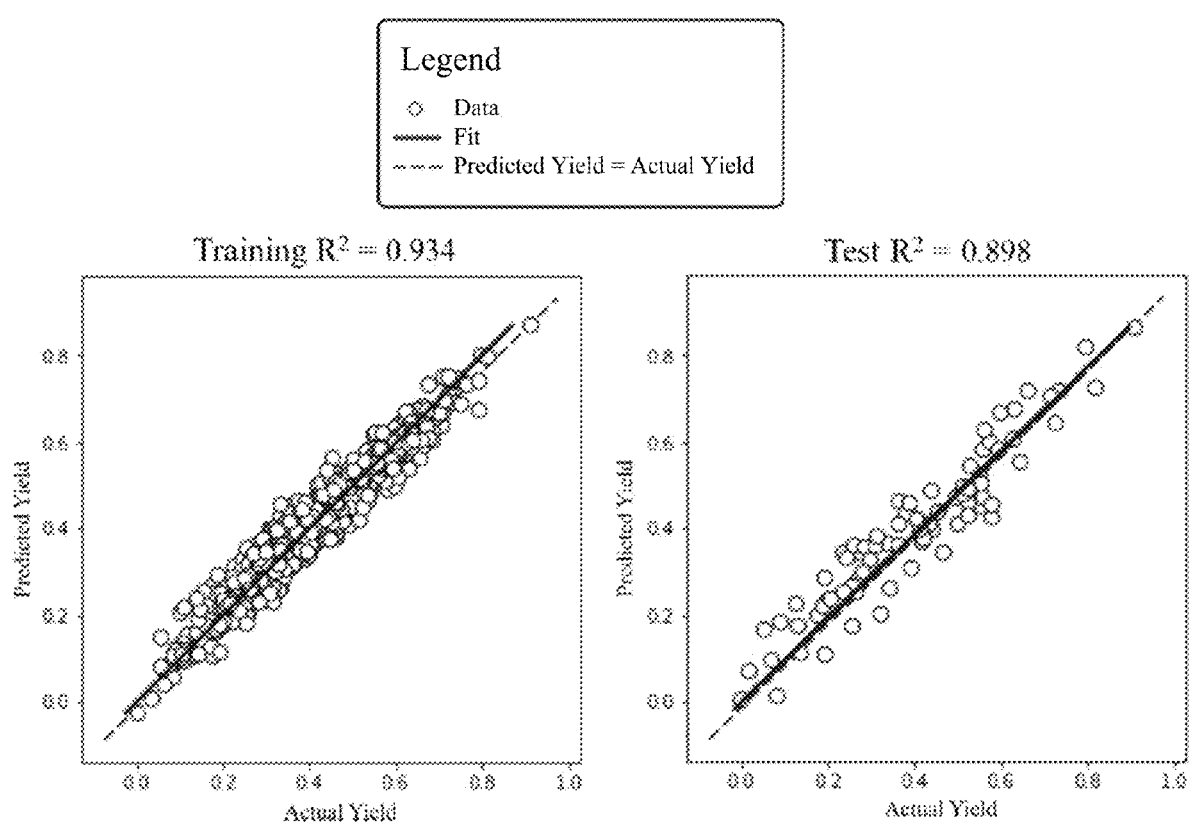
FIG. 26 includes charts showing a correlation between actual and target yield for training (left chart) and testing (right chart) of an artificial neural network according to various embodiments.

K-fold cross validation randomly selected training and test sets so there would be a slight performance variation, as training samples can change. However, the best of 10-folds appears to have relatively higher performance compared to average of 10-folds. As such, it may not be considered as a reliable estimate or the true representative of the generalization capability of the model. The average of 10-folds results indicated high coefficient of determination and low MSE for average of 10-folds suggesting high performance of ANN based yield estimation model. The observed and estimated values are depicted in FIG. 26 for best of the 10-fold results which revealed that there exists a one to one correspondence among the actual and predicted yield values confirming high performance of the ANN model. Specifically, FIG. 26 shows a correlation between actual and target yield for training (left chart) and testing (right chart) of an artificial neural network.

The embodiments and data presented herein demonstrate the feasibility of incorporating UAS-based features to predict yield using an artificial neural network model. The embodiments demonstrate how multi-temporal, non-temporal, and qualitative features can be incorporated into a single feature vector for use as an input to the ANN model to estimate yield (e.g., cotton yield for cotton). An initial implementation that includes all of the features showed accurate yield prediction with a low MSE. A performance comparison of the ANN model with SVR and RFR reveals that, although the ANN model achieved a higher $R^2$ for the test set as compared to SVR and RFR, all the three models were able to generalize with an acceptable accuracy ($R^2$ higher than 0.82 in average of 10 runs and higher than 0.85 for best case scenario). Notably, if some inherent learnable patterns exist in a training set, any machine learning model which can handle non-linearity in data may perform reasonably with appropriate parameter tuning. Thus, preparing the training set that comprises the appropriate input features having learnable patterns pertaining to the target is more critical as compared to the choice of a regression model.

However, an ANN tends to perform better in a multi-modality scenario where the input variable set comprised of three different types of features, namely, multi-temporal, non-temporal, and qualitative features. Sensitivity analysis using a stepwise elimination of the input variables suggests some redundancy in the initial input variable set, with the exception of boll count and irrigation status, meaning except for these two variables, removing any other variables from the set did not make any significant change in the accuracy of the prediction. A correlation analysis may be used to eliminate redundant variables resulting in a reduced subset of the input variables. Plant canopy attributes and vegetation indices computed using an RGB sensor data were adequate for accurate yield prediction. This may be used in the future to reduce overall experimental costs and data collection time.

Moreover, RGB sensors are robust and less expensive when compared to multispectral sensors. An additional stepwise elimination analysis suggested that the reduced input variable set was the optimal subset as removing any of these inputs affected the prediction accuracy of the network. With the optimal subset of input variables, the network training time was reduced by more than 50%, as the original input vector size was seventy-five and reduction resulted in a vector size of thirty-two. Quantifying the significance of individual input variables in the ANN model is very important to open the "black box" model and provide information pertaining to the role of each variable in the model.

In agriculture, finding the variables contributing to crop yield is important as it helps farmers and agriculture scientists reduce environmental impact while increasing agricultural sustainability. To determine the input variables with the most impact on yield, a sensitivity analysis was carried out using the weights method. Results indicated that canopy volume had the greatest impact on cotton yield followed by the excessive greenness index and the difference between the relative contribution of the most important and the least important variable was 12%. The embodiments described herein also explore how early in the growing season yield can be reasonably predicted. The input variable set excluded boll count and boll volume as the open cotton bolls are only visible after plant maturity. Canopy volume, ExG, and the irrigation status may be used to predict the yield and tested by gradually reducing the number of DAP. The prediction accuracy decreased as the DAP decreased and an inspection of the rate of decay in the prediction accuracy revealed that it was commensurate with the growth pattern of the canopy attributes used as input variables.

For the DAP greater than seventy, canopy attributes were close to attaining a plateau and there was no significant change in the attribute values with an increase in days after planting (DAP). However, between fifty and seventy DAP the crop growth pattern resembles a steep slope (e.g., linear phase of plant growth) and the prediction accuracy at 55 DAP was noticeably lower when compared to DAP greater than seventy. The ANN model was able to predict cotton yield with an $R^2$ greater than 0.7 as early as seventy DAP. Although many factors, such as biotic and abiotic stresses, may affect the crop growth between the end of remote-sensing measurements and harvest, an early stage yield prediction can help farmers and agricultural scientists make crop management and marketing decisions based on the predicted yield potential. Breeding trials generally contain thousands of plots, and breeders could benefit from a high prediction accuracy model that assists in selecting suitable genotypes without the need to harvest each plot to determine productivity (e.g., crop yield), reducing overall program costs.

Increased screening efficiency will allow them to explore a larger number of genotypes. The results demonstrate that UAS technology can be used as a high precision, cost-effective system to extract canopy attributes throughout the growing season for yield prediction. Collecting high quality UAS data is critical for computation of crop canopy attribute and VIs which can be greatly affected by UAS's flying altitude, forward, and side overlaps, spatial resolution, and the entirety of the DTM obtained using SfM routines.

Additionally, weather conditions play an important role in the UAS data collection and should be considered since they affect the quality of data products (e.g. orthomosaics and DEMs), which in turn affects the quality of the extracted plant canopy attributes. Quality of sensors also determines the quality of the vegetation indices computed such as NDVI. NDVI maps were mostly consistent as the data were collected during the same time of the day throughout the growing season. Additionally, the sensor used for multispectral data was the same throughout the data collection, and NDVI is computed as the band combination and the computation do not utilize any numerical constants which is typically determined using reflectance data.

Moreover, reliability of the multispectral data is not a primary concern, as it was demonstrated that the optimal feature subset for the yield prediction model did not utilize any feature derived from multispectral data. Crop yield estimation in this study was limited to the range of the available yield values with no extrapolation beyond the data limits. Moreover, geographical location was also a constraint, as the experiments were limited to single study site for a single year.

According to various embodiments, a machine learning model may be developed to predict yield of a crop or plant by leveraging high resolution UAS imagery to derive biologically relevant attributes, such as plant canopy attributes. The ability to combine temporal, non-temporal, and qualitative features to predict crop yield is very powerful. The embodiments described herein are able to predict cotton yield with an $R^2$ value of 0.89 in the best-case scenario and an $R^2$ of 0.85 in an average of ten runs. Redundant input variables were eliminated by sensitivity analysis, and an optimal subset of input variables was obtained. Plant canopy attributes were derived from RGB data, reducing the overhead of collecting multispectral data.

Moreover, the ANN training time was reduced by more than 50% with no significant reduction in the prediction accuracy. Findings from this study can serve as a valuable tool for cotton breeding research programs. If breeders can incorporate the technology, there is potential to increase genotype selection efficiency. With this technology agricultural scientists, as well as crop managers, crop consultants, and farmers can have access to a level of information about the crop that was not previously available, helping in the decision-making process. Finally, with an accurate early stage yield prediction, appropriate crop management decisions can be taken to improve efficiency and sustainability of farming operations.

The image processing routines and machine learning routines described herein, as well as other data processing algorithms or routines, may be implemented on a server so that end users can access the features through a portal to perform advanced analysis without downloading data or installing software on an end user machine, thereby increasing time efficiency and lowering cost of implementation, deployment, and/or maintenance. The portal may include various tools, such as a two-dimensional data visualization tool, a three-dimensional data visualization tool for three-dimensional point clouds, an image clipping tool, a canopy cover measurement tool, a cotton simulation tool, a data management tool (allows upload and download of data), a crop/plant growth analysis tool, etc.

The computing environment 140 includes one or more computing devices. Each computing device includes at least one processor circuit, for example, having a processor and memory, both of which are coupled to a local interface. To this end, each computing device may comprise, for example, at least one server computer or like device. The local interface may comprise, for example, a data bus with an accompanying address/control bus or other bus structure, as can be appreciated.

Stored in the memory are both data and several components that are executable by the processor. In particular, stored in the memory and executable by the processor are the image analysis module 150, the image processing routines 155, and potentially other applications. Also stored in the memory may be a data store 145 and other data. In addition, an operating system may be stored in the memory and executable by the processor. It is understood that memory relates to a storage media, accessible locally and/or remotely by means of a wired or wireless network or communication protocol.

It is understood that there may be other applications that are stored in the memory and are executable by the processor as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory and are executable by the processor. In this respect, the term "executable" means a program file that is in a form that can ultimately be run by the processor. Examples of executable programs may be, for example, a compiled program that can be translated into machine code in a format that can be loaded into a random access portion of the memory and run by the processor, source code that may be expressed in proper format such as object code that is capable of being loaded into a random access portion of the memory and executed by the processor, or source code that may be interpreted by another executable program to generate instructions in a random access portion of the memory to be executed by the processor, etc. An executable program may be stored in any portion or component of the memory including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory is defined herein as including both volatile and nonvolatile memory and data storage components. Volatile components are those that do not retain data values upon loss of power. Nonvolatile components are those that retain data upon a loss of power. Thus, the memory may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. They may also be accessed via networks, including, for example, the Internet, intranets, extranets, wide area networks (WANs), local area networks (LANs), wired networks, wireless networks, or other suitable networks, etc., or any combination of two or more such networks. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor may represent multiple processors and/or multiple processor cores and the memory may represent multiple memories that operate in parallel processing circuits, respectively. In such a case, the local interface may be an appropriate network that facilitates communication between any two of the multiple processors, between any processor and any of the memories, or between any two of the memories, etc. The local interface may comprise additional systems designed to coordinate this communication, including, for example, performing load balancing. The processor may be of electrical or of some other available construction.

Although the image analysis module 150, the image processing routines 155, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts show the functionality and operation of an implementation of portions of the computing environment 140 or other computing device. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor in a computer system or other system. The machine code may be converted from the source code, etc. If embodied in hardware, each block may represent a circuit or a number of interconnected circuits to implement the specified logical function(s).

Although the flowcharts show a specific order of execution, it is understood that the order of execution may differ from that which is depicted. For example, the order of execution of two or more blocks may be scrambled relative to the order shown. Also, two or more blocks shown in succession in the flowcharts may be executed concurrently or with partial concurrence. Further, in some embodiments, one or more of the blocks shown in the flowcharts may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the image analysis module 150 and the image processing routines 155, that comprises software or code can be embodied in any non-transitory computer-readable medium for use by or in connection with an instruction execution system such as, for example, a processor in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the image analysis module 150 and the image processing routines 155, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device, or in multiple computing devices in the same computing environment 140. Additionally, it is understood that terms such as "application," "service," "system," "engine," "module," and so on may be interchangeable and are not intended to be limiting.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A system for analyzing plant genotypes planted in a field, comprising:
   at least one computing device comprising at least one hardware processor; and
   program instructions stored in memory and executable in the at least one computing device that, when executed, direct the at least one computing device to:
      access at least one image of a field from memory, the at least one image of the field having a first genotype and a second genotype of at least one crop or plant planted therein;
      apply an image processing routine to the at least one image to analyze the at least one image of the field and determine a plurality of characteristics of the first genotype and the second genotype of the at least one crop or plant planted in the field; and
      apply a machine learning routine to forecast a first estimated yield of the first genotype and a second estimated yield of the second genotype, wherein an input of the machine learning routine comprises at least a portion of the plurality of characteristics of the first genotype and the second genotype; and
      perform a comparison of the first estimated yield of the first genotype with the second estimated yield of the second genotype.

2. The system of claim 1, further comprising an unmanned aerial system (UAS) comprising at least one sensor device, the at least one image of the field being captured by the unmanned aerial system during a navigation of the unmanned aerial system relative to the field.

3. The system of claim 2, wherein the at least one image of the field comprises a plurality of images of the field captured during multiple navigations of the unmanned aerial system over the field performed at different periods in a growing cycle of the at least one crop or plant.

4. The system of claim 1, wherein the at least one computing device is further directed to generate a recommendation between the first genotype and the second genotype, the recommendation being generated based at least in part on the comparison of the first estimated yield of the first genotype and the second estimated yield of the second genotype.

5. The system of claim 1, wherein the machine learning routine comprises an artificial neural network (ANN) or a convolutional neural network (CNN).

6. The system of claim 1, wherein at least one of the plurality of characteristics determined is selected from a group consisting of: canopy cover, canopy height, canopy volume, normalized difference vegetation index (NDVI), excessive greenness index (ExG), irrigated, and non-irrigated.

7. The system of claim 1, wherein:
   the input of the machine learning routine further comprises a soil characteristic and a weather characteristic;
   the solar characteristic is selected from a group consisting of: soil type, physical soil property; soil chemical property; nutrient deficiency; and mildew characteristic; and
   the weather characteristic is selected from a group consisting of: humidity, precipitation, temperature, solar radiation, crop canopy temperature, and crop evapotranspiration.

8. The system of claim 1, wherein the at least one computing device is further directed to interpolate data based on measurements of the characteristics taken at different periods of time using an interpolation routine to generate a measurement for each of the plurality of characteristics at a predefined sequence.

9. The system of claim 1, wherein the at least one computing device is further directed to generate at least one of: an orthorectified mosaic; a digital surface model; and a canopy height model (CHM) of the at least one crop or plant in the field.

10. The system of claim 9, wherein the at least one computing device is further directed to derive at least a portion of the plurality of characteristics from at least one of the orthorectified mosaic; the digital surface model; and the canopy height model.

11. A computer-implemented method for analyzing plant genotypes planted in a field, comprising:
    obtaining at least one image of a field from memory, the at least one image of the field having a first genotype and a second genotype of at least one crop or plant planted therein;

applying an image processing routine to the at least one image to analyze the at least one image of the field and determine a plurality of characteristics of the first genotype and the second genotype of the at least one crop or plant planted in the field; and applying a machine learning routine to forecast a first estimated yield of the first genotype and a second estimated yield of the second genotype, wherein an input of the machine learning routine comprises at least a portion of the plurality of characteristics of the first genotype and the second genotype; and performing a comparison of the first estimated yield of the first genotype with the second estimated yield of the second genotype.

12. The computer-implemented method of claim 1, wherein the at least one image of the field is at least on image captured by an unmanned aerial system (UAS) during a navigation of the unmanned aerial system relative to the field.

13. The computer-implemented method of claim 12, wherein the at least one image of the field comprises a plurality of images of the field captured during multiple navigations of the unmanned aerial system over the field performed at different periods in a growing cycle of the at least one crop or plant.

14. The computer-implemented method of claim 11, further comprising generating a recommendation between the first genotype and the second genotype, the recommendation being generated based at least in part on the comparison of the first estimated yield of the first genotype and the second estimated yield of the second genotype.

15. The computer-implemented method of claim 11, wherein the machine learning routine comprises an artificial neural network (ANN) or a convolutional neural network (CNN).

16. The computer-implemented method of claim 11, wherein at least one of the plurality of characteristics determined is selected from a group consisting of: canopy cover, canopy height, canopy volume, normalized difference vegetation index (NDVI), excessive greenness index (ExG), irrigated, and non-irrigated.

17. The computer-implemented method of claim 11, wherein:
the input of the machine learning routine further comprises a soil characteristic and a weather characteristic;
the solar characteristic is selected from a group consisting of: soil type, physical soil property; soil chemical property; nutrient deficiency; and mildew characteristic; and
the weather characteristic is selected from a group consisting of: humidity, precipitation, temperature, solar radiation, crop canopy temperature, and crop evapotranspiration.

18. The computer-implemented method of claim 11, further comprising interpolating data based on measurements of the characteristics taken at different periods of time using an interpolation routine to generate a measurement for each of the plurality of characteristics at a predefined sequence.

19. The computer-implemented method of claim 11, further comprising generating at least one of: an orthorectified mosaic; a digital surface model; and a canopy height model (CHM) of the at least one crop or plant in the field.

20. The computer-implemented method of claim 19, further comprising deriving at least a portion of the plurality of characteristics from at least one of the orthorectified mosaic; the digital surface model; and the canopy height model.

\* \* \* \* \*